United States Patent
Wang et al.

(10) Patent No.: US 7,817,320 B1
(45) Date of Patent: Oct. 19, 2010

(54) TWO-ELEMENT Fθ LENS WITH SHORT FOCAL DISTANCE FOR LASER SCANNING UNIT

(75) Inventors: Chih-Peng Wang, Taipei (TW); Huang-Chang Chen, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/634,548

(22) Filed: Dec. 9, 2009

(30) Foreign Application Priority Data

Jun. 25, 2009 (TW) .............................. 98121473 A

(51) Int. Cl.
*G02B 26/08* (2006.01)

(52) U.S. Cl. .............. 359/206.1; 359/207.3; 359/216.1; 359/662

(58) Field of Classification Search ... 359/205.1–207.6, 359/216.1–219.2, 662
See application file for complete search history.

(56) References Cited

U.S. PATENT DOCUMENTS

| | | | |
|---|---|---|---|
| 5,111,219 A | 5/1992 | Makino | |
| 5,136,418 A | 8/1992 | Itabashi | |
| 5,247,383 A * | 9/1993 | Brueggemann | .......... 359/197.1 |
| 6,324,015 B1 | 11/2001 | Fuse | |
| 6,919,993 B2 | 7/2005 | Honda | |
| 6,933,961 B2 | 8/2005 | Kato | |
| 7,057,781 B2 | 6/2006 | Ishihara | |
| 7,130,096 B2 | 10/2006 | Fujino | |
| 2009/0244672 A1 * | 10/2009 | Shih et al. | ................ 359/206.1 |

FOREIGN PATENT DOCUMENTS

| | | |
|---|---|---|
| JP | 2756125 | 8/1990 |
| JP | 04-50908 | 2/1992 |

OTHER PUBLICATIONS

English Abstract of JP2756125, Aug. 5, 1990.
English Abstract of JP04-50908, Feb. 19, 1992.

* cited by examiner

*Primary Examiner*—James Phan
(74) *Attorney, Agent, or Firm*—WPAT, P.C.; Anthony King

(57) ABSTRACT

A two-element fθ lens with short focal distance is used for a laser scanning unit with a polygon mirror and the two-element fθ lens comprises a first lens and a second lens. The first lens is a positive power meniscus lens and the second lens is a negative power meniscus lens in the main scanning direction. The first lens has a first and a second optical surface, the second lens has a third and a fourth optical surface. Concave surfaces of the first, second and third optical surfaces are disposed on the polygon mirror side. The fourth optical surface has an inflection point in SAG counted from the optical axis to peripheral portion and its paraxial portion is convex that is disposed on the polygon mirror side. The two-element fθ lens satisfies an optical condition of $0.4557 \leq \tan(\beta) \leq 0.7265$, wherein $\beta$ is a maximum effective window angle.

4 Claims, 18 Drawing Sheets

TWO-ELEMENT Fθ LENS WITH SHORT FOCAL DISTANCE FOR LASER SCANNING UNIT

BACKGROUND OF THE INVENTION

1. Field of the Invention

The present invention relates to a two-element fθ lens with short focal distance for a laser scanning unit, and more particularly to a two-element fθ lens used for a laser scanning unit with a polygon mirror, which has a short focal distance to reduce the volume of the laser scanning unit.

2. Description of the Related Art

At present, a laser scanning unit (LSU) used by a laser beam printer (LBP) controls a laser beam scanning by a high-speed polygon mirror as disclosed in U.S. Pat. Nos. 7,079,171, 6,377,293 and 6,295,116 or TW Pat. No. I198966, and the principles of their operation are described below: a semiconductor laser emits a laser beam through a collimator and an aperture to form parallel beams. After the parallel beams pass through a cylindrical lens, the beams are focused to form a line image, and projected onto the high-speed polygon mirror. The polygon mirror includes a plurality of uniform and continuous reflecting mirrors disposed at or proximate to the focal point of the line image. The polygon mirror is provided for controlling the direction of projecting the laser beam, so that when the plurality of continuous reflecting mirrors are rotated at a high speed, the laser beam projected onto a reflecting mirror can be extended in a direction of the scanning direction at the same angular velocity and deviated from and reflected onto a fθ linear scanning lens. The fθ linear scanning lens (so called fθ lens) is installed next to the polygon mirror and can be either a single-element lens structure or a two-element lens structure. The function of this fθ lens is to focus a laser beam reflected from the reflecting mirror of the polygon mirror and projected onto the fθ lens into a circular spot (or an oval spot) that is projected onto a photoreceptor surface (or a photoreceptor drum, which is an image side) to achieve the requirement of the scanning linearity as disclosed in U.S. Pat. Nos. 4,707,085 and 6,757,088 or Japan Pat. No. 2004-294713. However, the traditional fθ lens of laser scanning unit LSU still has the following drawbacks in its practical applications:

(1) When a laser beam is reflected from a polygon mirror, the central of the laser beam projected onto a reflecting mirror of the polygon mirror is not aligned physically with the central rotating axis of the polygon mirror, so that the design of a fθ lens has to take the issue of a reflection deviation of the polygon mirror into consideration. In the prior art, an optical correction of a sub scanning direction is adopted to correct the optics of a main scanning direction, as disclosed in U.S. Pat. Nos. 5,111,219 and 5,136,418, and Japan Pat. No. 2756125. However, these optical correction methods for correcting the reflection deviation by adjusting the sub scanning direction appropriately require a longer focal length, and thus results in an increased overall volume of the laser scanning unit.

(2) A fθ lens having a longer focal length is generally used to make the diameter of a spot of the scanning light projected onto a drum in compliance with the specification or requirement of the application, in order to achieve a better image quality. Some manufacturers even use a reflecting mirror to extend the focal distance as disclosed in U.S. Pat. No. US2002/0063939 or a three-element lens as disclosed in U.S. Pat. Application No. 2002/0030158, and U.S. Pat. No. 5,086,350 and Japan Pat. No. 63-172217. Some manufacturers use a hard-to-make diffraction lens as disclosed in U.S. Pat. Application No. 2001/0009470 and U.S. Pat. No. 5,838,480. Some manufacturers use a two-element lens having an inflection point as disclosed in U.S. Pat. Nos. 5,111,219, 7,057,781, 6,919,993 or a single-element lens having an inflection point as disclosed in Japan Pat. No. 04-50908.

(3) One of the conventional methods for reducing the volume of the laser scanning unit to fit an application for a smaller printer is to shorten the focal distance to the drum as disclosed in U.S. Pat. No. 7,130,096, wherein the ratio of an effective scanning range and an image optical length is used for reducing the focal distance and eliminating the ghost image. As disclosed in U.S. Pat. No. 6,324,015, the restrained ratio (d/f) of the focal distance between the polygon mirror with the drum and the focal length of the fθ lens is used for shortening the focal distance. Thus, for example, the focal length is 100 mm, and the focal distance is approximately equal to 200 mm Moreover, a two-element fθ lens as disclosed in U.S. Pat. No. 6,933,961 adopts an asymmetric optical surface to produce an axis deviation on the main-scanning or the sub scanning direction, such that the optical axis of the two fθ lenses in the main scanning direction or the sub scanning direction in order to reduce the focal distance.

To satisfy consumer requirement for a light, thin, short and compact design of the laser scanning unit, a two-element fθ lens having a short focal distance (such as a focal distance less than 150 mm used in an A4 laser printer) may be adopted the needs in effective correcting optical distortion in the main scanning direction and the sub scanning direction as well as in improving the scanning quality and the resolution.

SUMMARY OF THE INVENTION

Therefore, it is a primary objective of the present invention to provide a two-element fθ lens with short focal distance for a laser scanning unit, and the two-element fθ lens is applied to a laser scanning unit having a polygon mirror, and the two-element fθ lens comprises a first lens and a second lens along an optical axis from a polygon mirror side to a target side, wherein the first lens is a meniscus shape having a concave surface toward the polygon mirror; and the second lens is a meniscus shape having a concave surface toward the polygon mirror. The first lens includes a first optical surface and a second optical surface having positive refractive power in main scanning direction on optical axis of the laser scanning unit. The second lens includes a third optical surface and a fourth optical surface having negative refractive power in main scanning direction on optical axis of the laser scanning unit. The fourth optical surface has an inflection point in SAG counted from the optical axis to peripheral portion and its paraxial portion is convex toward the polygon mirror side. All optical surfaces are aspherical in the main scanning direction. The two-element fθ lens is primarily used for uniformizing the scanning light in the main scanning direction and the sub scanning direction to focus the scanning light on the target and for correcting the optical distortion caused by the deviation of the scanning light from the optical axis, so as to form a correct image of the scanning light reflected from the polygon mirror onto the target and achieve a scanning linearity required by the laser scanning unit.

Another objective of the present invention is to provide a two-element fθ lens with short focal distance for a laser scanning unit, which has a short focal distance to reduce the volume of the laser scanning unit and provide a good imaging effect. Such that fθ lens satisfies the condition $0.4557 \tan(\beta) \leq 0.7265$ wherein $\beta$ is a maximum effective window angle, such that a laser beam reflected from the polygon mirror to the two-element short focal distance fθ lens can meet the requirements of a spot area formed on the target by projecting a scanning light with a shorter focal distance to achieve the effect of reducing the volume of the laser scanning unit.

A further objective of the present invention is to provide a two-element fθ lens with short focal distance for a laser scanning unit, wherein distortions caused by the deviation of a scanning light from the optical axis and resulting in a deformation of spots formed on a drum and caused by the increased deviations in a main scanning direction and a sub scanning direction can be corrected. In addition, the size of each spot can be uniformized to achieve the effect of improving the resolution quality.

Therefore, the two-element fθ lens in accordance with the present invention is applicable for the laser scanning unit. A light beam emitted from a light source is reflected by the reflecting mirror disposed on the polygon mirror in the laser scanning unit and converted into a scanning light to project an image on the target. As to a laser printer, the target is preferably a drum. After a spot image of a scanning light is formed by scanning the laser beam emitted from a light source and reflected from the reflecting mirror of the polygon mirror, the angle and position of the scanning light are corrected by the two-element fθ lens with short focal distance in accordance with the present invention in order to form a spot on the drum. Since the drum is coated with a photosensitive agent and the photosensitive agent is used for sensing and collecting carbon powder on a piece of paper, therefore the data can be printed out.

To make it easier for our examiner to understand the technical characteristics and effects of the present invention, we use preferred embodiments and related drawings for the detailed description of the present invention as follows.

DETAILED DESCRIPTION OF THE PREFERRED EMBODIMENTS

Figure 1:
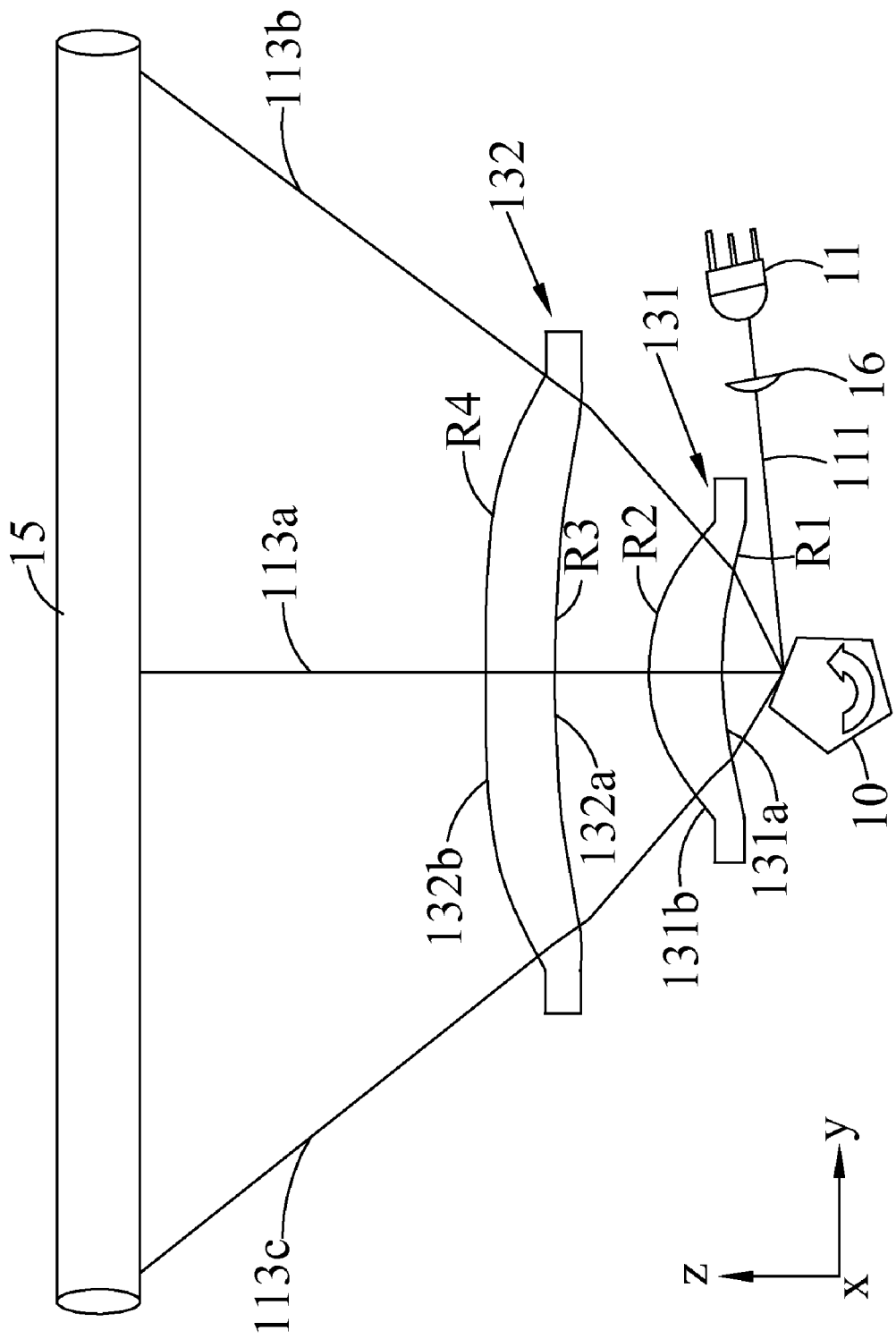
FIG. 1 is a schematic view showing optical paths of a two-element fθ lens in accordance with the present invention.
Figure 2:
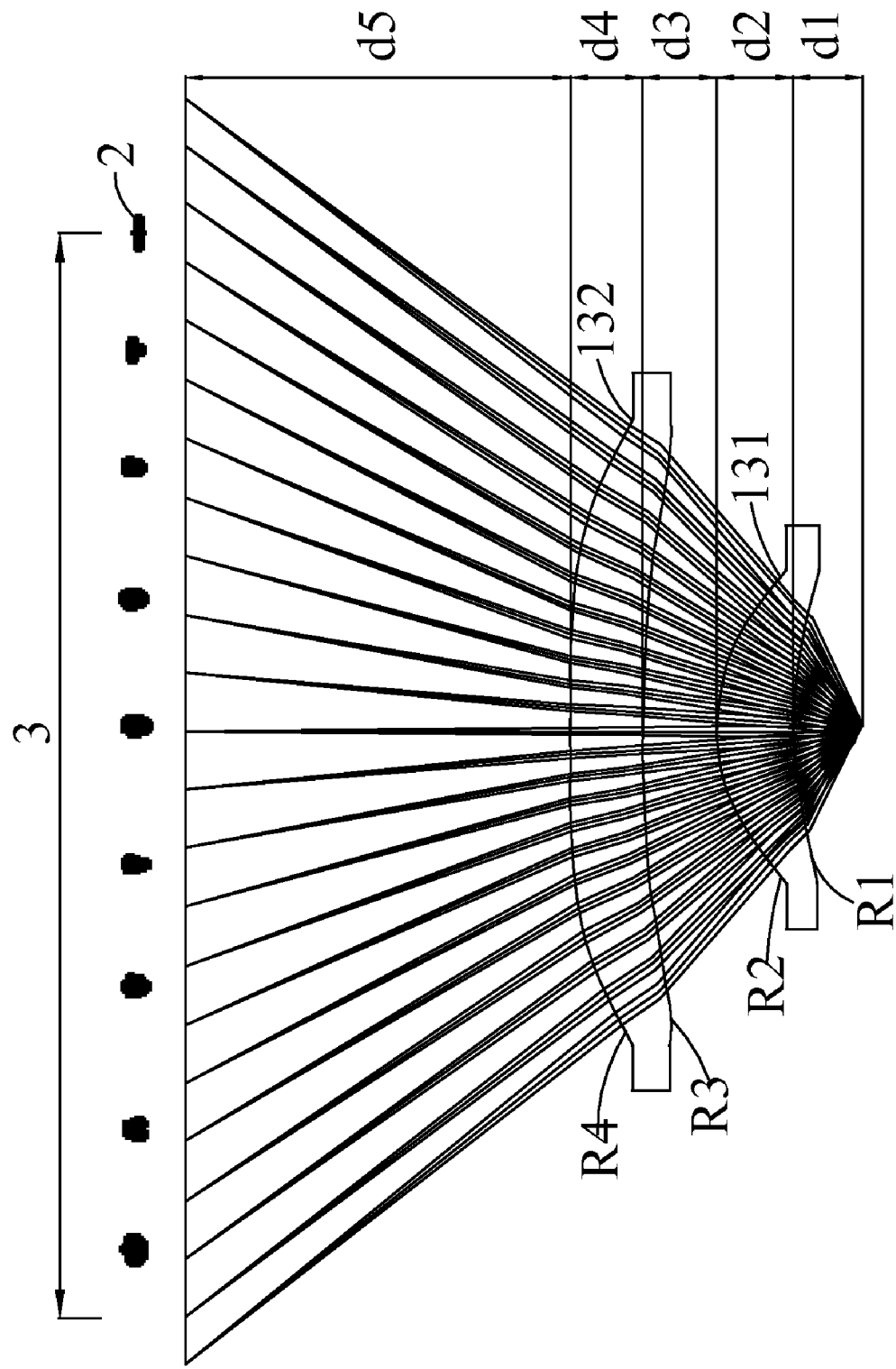
FIG. 2 is a schematic view showing optical paths of scanning lights passing through a first lens and a second lens in accordance with the present invention.

With reference to FIG. 1, which illustrates a schematic view showing optical paths of a two-element fθ lens in accordance with the present invention. The two-element fθ lens with short focal distance for a laser scanning unit comprises a first lens 131 having a first optical surface 131a and a second optical surface 131b, and a second lens 132 having a third optical surface 132a and a fourth optical surface 132b, and is applied to the laser scanning unit. In FIG. 1, the laser scanning unit mainly includes a laser light source 11, a polygon mirror 10, a cylindrical lens 16, and a target for sensing light. The target is a drum 15 in this preferred embodiment. After a light beam 111 produced by the laser light source 11 passes through the cylindrical lens 16, the light beam 111 is projected onto the polygon mirror 10. The polygon mirror 10 includes a plurality of reflecting mirrors (wherein five reflecting mirrors are used in this embodiment), and each reflecting mirror can be rotated with respect to the central rotation axis of the polygon mirror 10 for reflecting and converting the light beam 111 into scanning lights 113a, 113b, 113c. The X direction in which the scanning lights 113a, 113b, 113c are projected is called a sub scanning direction, and the Y direction in which the scanning lights are projected is called a main scanning direction. The most left end and the most right end are formed on the drum 15 by the scanning lights 113c, 113b emitted from the fourth optical surface 132b of the second lens. The distance between the most left and most right ends is defined as the width of an effective window 3, as shown in FIG. 2. Original document data on spots 2 within the range of the effective window 3 can be printed on printer paper by a toner.

With reference to FIGS. 1 and 2, FIG. 2 shows optical paths of scanning lights passing through a first lens and a second lens in accordance with the present invention. When the laser light source 11 starts emitting the laser light beam 111, and the polygon mirror 10 reflects and converts the laser light beam 111 into a scanning light. When the scanning light passes through the first lens 131, the scanning light is refracted by the first optical surface 131a and the second optical surface 131b of the first lens 131. Furthermore, when the scanning light passes through the second lens 132, the scanning light is refracted by the third optical surface 132a and the fourth optical surface 132b of the second lens 132. The scanning light, which is reflected by the polygon mirror 10 and presents a nonlinear relationship between distance and time since the angular velocity of the reflected scanning light.

When the scanning light passes through the first lens 131 and the second lens 132, the scanning light is modified as a linear relationship between distance and time. After the scanning light passes through the first lens 131 and the second lens 132, the scanning light is focused onto the drum 15 to form a row of spots 2 on the drum 15 by the optical properties of the first optical surface 131a, second optical surface 131b, third optical surface 132a, and fourth optical surface 132b, wherein $d_0$ is the minimum distance (not shown in the figure) from the cylindrical lens 16 to the reflection surface of the polygon mirror 10 along the optical axis; $d_1$ is the distance from the polygon mirror 10 to the first optical surface 131a along the optical axis; $d_2$ is the distance from the first optical surface 131a to the second optical surface 131b along the optical axis; $d_3$ is the distance from the second optical surface 131b to the third optical surface 132a along the optical axis; $d_4$ is the distance from the third optical surface 132a to the fourth optical surface 132b along the optical axis; $d_5$ is the distance from the fourth optical surface 132b to the drum 15 along the optical axis; $R_1$ is the radius of curvature of the first optical surface 131a; $R_2$ is the radius of curvature of the second optical surface 131b; $R_3$ is the radius of curvature of the third optical surface 132a; and $R_4$ is the radius of curvature of the fourth optical surface 132b.

Figure 3:
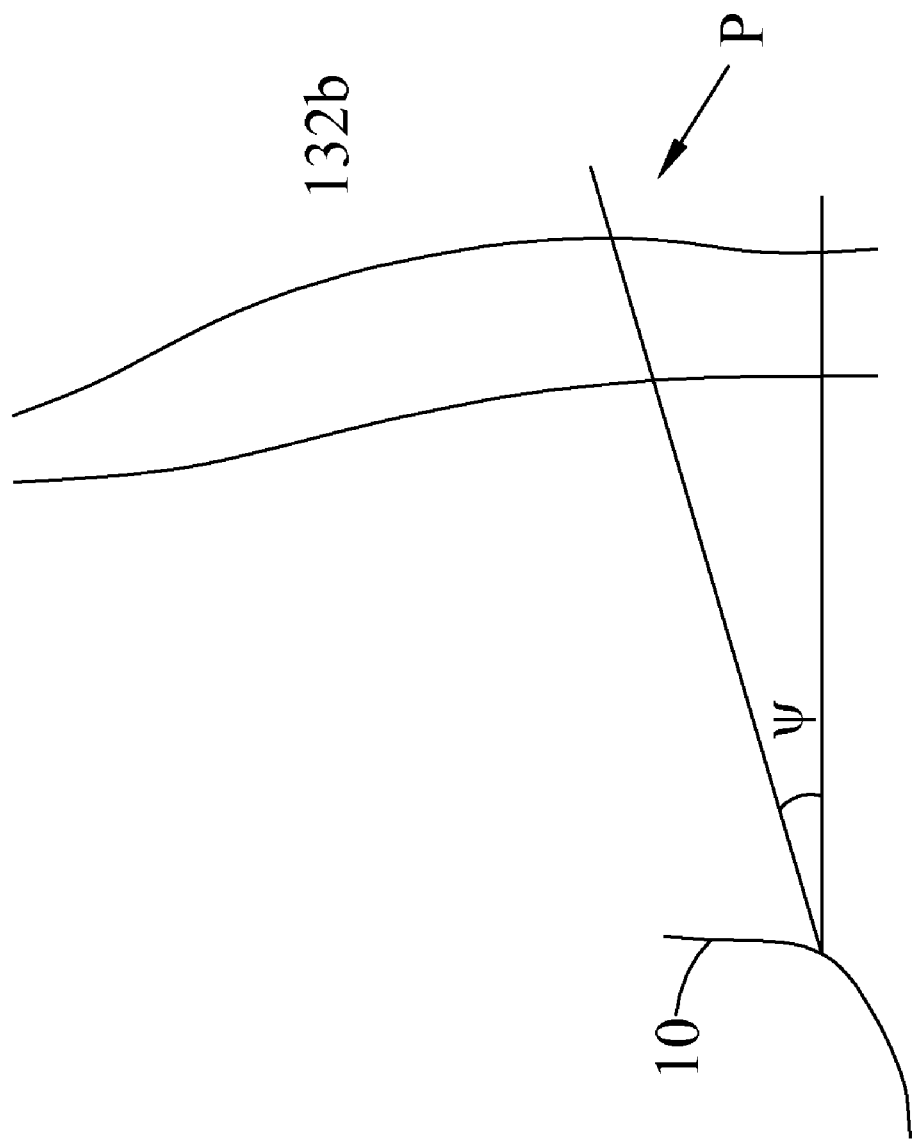
FIG. 3 is a schematic view showing an enlarged portion of an inflection point of a fourth optical surface in accordance with the present invention.
Figure 4:
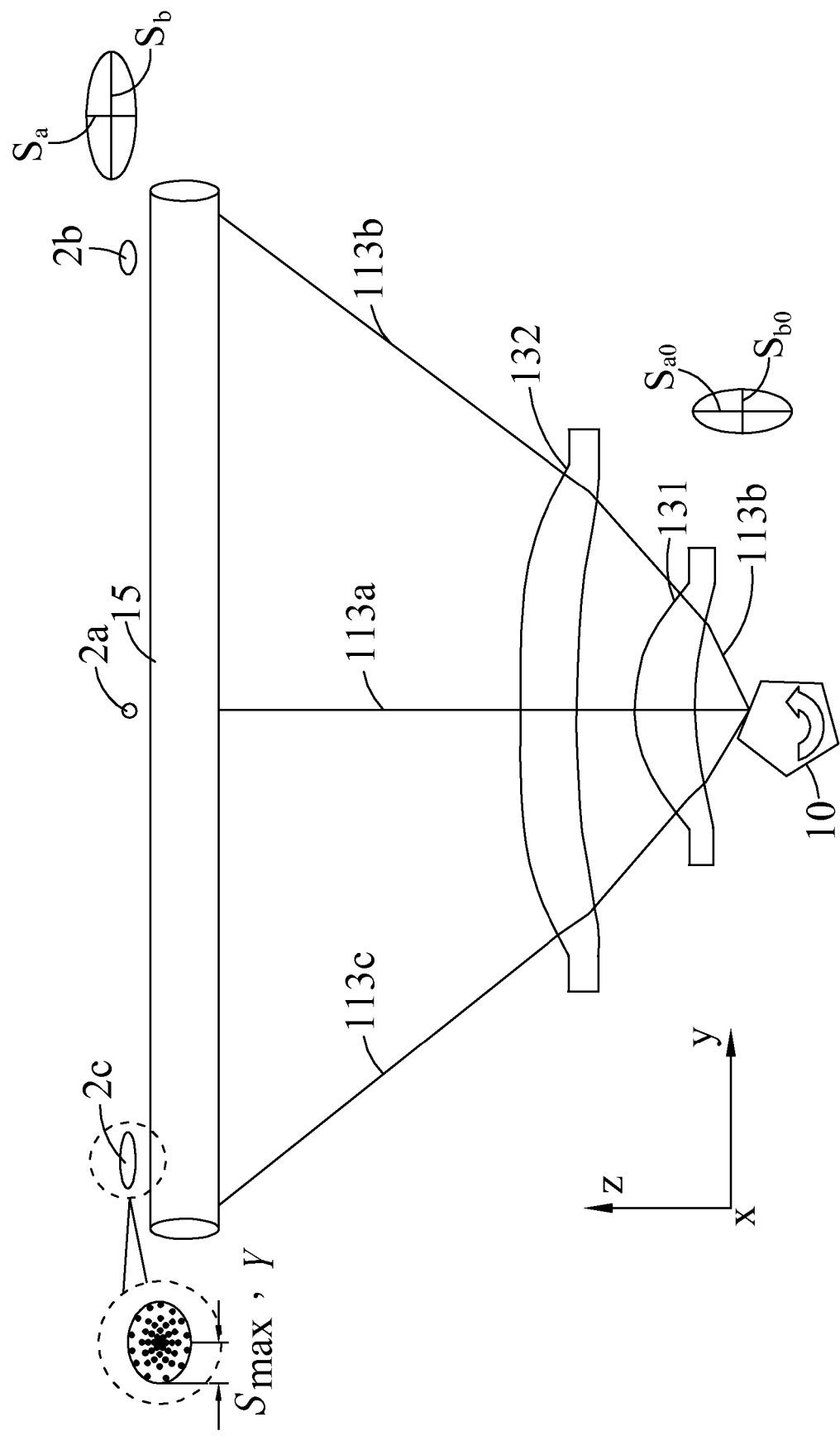
FIG. 4 is a schematic view showing a spot area of a geometric spot projected onto a drum.

In FIG. 3, the fourth optical surface 132b is an optical surface having an inflection point in SAG counted from the optical axis to peripheral portion in the main scanning direction, and the paraxial portion of the fourth optical surface 132b is convex toward the polygon mirror 10. The fourth optical surface 132b, paraxial portion of the optical surface is convex toward the polygon mirror 10 side, has an inflection point P such that the optical surface is gradually inverted away from the optical axis to peripheral portion. That the peripheral portion of the optical surface is presented as concave toward the polygon mirror 10 side With reference to FIG. 4, which illustrates a schematic view showing a spot area varying with different positions after the scanning light is projected onto a drum. After the scanning light 113a passes through the first lens 131 and the second lens 132 in the main scanning direction and sub scanning direction, the scanning light 113a is projected onto the drum 15. Since the angle between the optical axis and the scanning light 113a is zero, the minimum deviation in the main scanning direction is produced. Then the spot 2a projected on the drum 15 has a quasi-circular shape. When the scanning lights 113b, 113c passing through the first lens 131 and the second lens 132 are projected onto the drum 15, the included angle between the light incident into the first lens 131 and the second lens 132 and the optical axis is non-zero, and thus the deviation produced in the main scanning direction is leaded, such as spots 2b and 2c. The projection length of the spots 2b. 2c is greater than the projection length of the spot 2a, and those spots are projected in the main scanning direction. This situation also occurs in the sub scanning direction too. The spots formed by the scanning lights 113b, 113c deviated from the scanning light 113a are greater than spot 2a, and thus the spots 2b and 2c imaged on the drum 15 are in a quasi-elliptical shape, and the areas of the spots 2b, 2c are larger than the area of the spot 2a, normally. $S_{a0}$ and $S_{b0}$ are root mean square spot radii of the scanning lights on a reflection surface of the polygon mirror 10 in the main scanning direction (Y direction) and the sub scanning direction (X direction) respectively, $S_a$ and $S_b$ are root mean square spot radii on the target in the X direction and the Y direction respectively, and $S_{max,Y}$ is the maximum radius of any spot in the main scanning direction.

Figure 5:
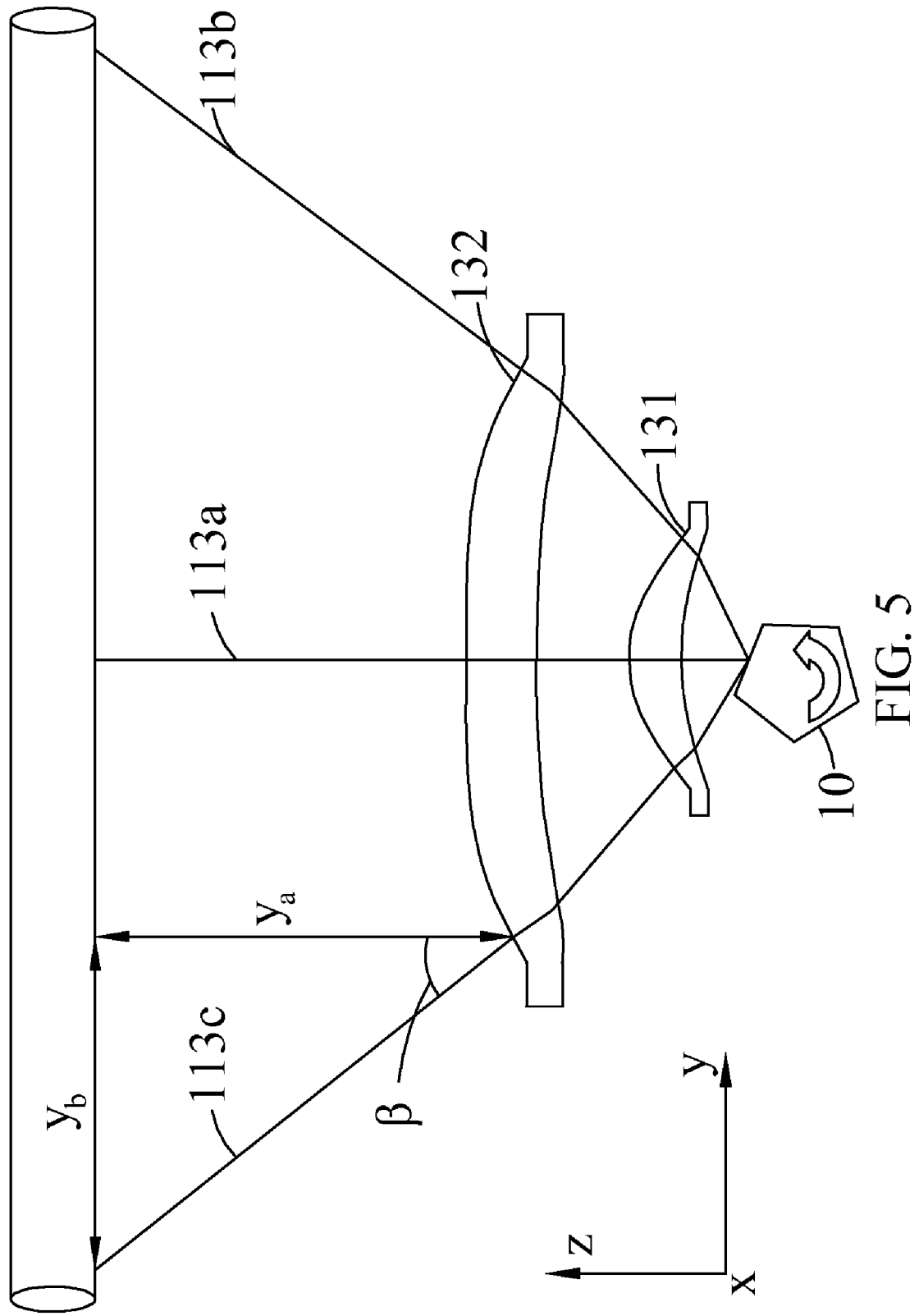
FIG. 5 is a schematic view showing the maximum effective window.

With reference to FIG. 5, which illustrates a schematic view showing an effective window and a maximum effective window angle β of the scanning light projected onto the drum 15. After a scanning light 113c at the most left end is emitted from the fourth optical surface 132b of the second lens 132, the included angle between the scanning light 113c and a straight line parallel to the optical axis is defined as the maximum value of an effective window angle. The imaging distance from the polygon mirror 10 to the drum 15 can be shortened, that is the focal distance can be shortened to achieve the purpose of reducing the volume of the laser scanning unit. To reduce the focal distance, the factors in the optical design such as the optical properties of the four optical surfaces of the first lens 131 and the second lens 132, the physical properties (such as refraction index and Abbe number) of the material for use in the first lens 131 and the second lens 132 can be adaptived to shorten the focal distance (d1+d2+d3+d4+d5). In addition to an air space (d1+d3+d5) and the value of the maximum effective window angle β can be designed to increase the opening angle of the scanning lights. The relationship between the maximum effective window angle β and the distance from the second lens 132 to the drum 15 is represented by Equation (1). The value of $y_a$ can be effectively reduced as the increasing the value of β under a fixed effective window is applied.

$$\beta = \tan^{-1}\left(\frac{y_b}{y_a}\right) \quad (1)$$

Where, $y_a$ is the distance along the main scanning direction (Y direction) between the center of light spot on the drum 15 which projected by the end scanning light (either the most left end 113c or the most right end 113b) emitted from the fourth optical surface 132b of the second lens 132 and the incident point which emerged from the point by the end scanning light and the fourth optical surface 132b, and yb is the distance along the sub scanning direction (X direction) between the center of light spot on the drum 15 which projected by the end scanning light (either the most left end 113c or the most right end 113b) emitted from the fourth optical surface 132b of the second lens 132 and the intersection point on the drum 15 which emerged from the line paralleled to the optical axis on the incident point and the drum 15.

In summation of the description above, the two-element fθ lens with short focal distance in accordance with the present invention can correct the distortion of a scanning light reflected from the polygon mirror 10. When the scanning light passes through the first lens and the second lens, the two-element fθ lens converts the scanning light having a nonlinear relationship between time and distance (angular velocity) into the scanning light having a linear relationship between time and distance. The beam radius of the scanning light in the sub scanning direction (X direction) and the main scanning direction (Y direction) passing through the fθ lens at each angle allows uniform spots to be formed on the imaging surface. The two-element fθ lens of the invention not only can provide a desired resolution, but also can effectively shorten the focal distance to reduce the volume of the laser scanning unit.

To achieve the aforementioned effect, the two-element fθ lens with short focal distance in accordance with the present invention may be designed in that for the first optical surface 131a or the second optical surface 131b of the first lens 131 and the third optical surface 132a or the fourth optical surface 132b of the second lens 132 is a spherical surface or an aspherical surface in the main scanning (Y) direction or the sub scanning (X) direction. If an aspherical surface is adopted, the aspherical surface is designed with the following equations:

1: Anamorphic Equation $$Z = \frac{(C_x)X^2 + (C_y)Y^2}{1 + \sqrt{1 - (1 + K_x)(C_x)^2 X^2 - (1 + K_y)(C_y)^2 Y^2}} + \quad (2)$$
$$A_R[(1 - A_P)X^2 + (1 + A_P)Y^2]^2 + B_R[(1 - B_P)X^2 + (1 + B_P)Y^2]^3 +$$
$$C_R[(1 - C_P)X^2 + (1 + C_P)Y^2]^4 + D_R[(1 - D_P)X^2 + (1 + D_P)Y^2]^5$$

where, Z is the SAG of any point on the lens surface in the direction of the optical axis to a tangential plane at the point 0; $C_x$ and $C_y$ are curvatures in the X direction and the Y direction respectively; $K_x$ and $K_y$ are conic coefficients in the X direction and the Y direction respectively, $A_R$, $B_R$, $C_R$ and $D_R$ are the rotationally symmetric portions of the 4th, 6th, 8th, and 10th order deformations from the conic respectively, and $A_P$, $B_P$, $C_P$, and $D_P$ are non-rotationally symmetric portions of the 4th, 6th, 8th and 10th order deformations from the conic respectively. The surface will be simplified as a single aspherical surface if $C_x = C_y$, $K_x = K_y$, and $A_P = B_P = C_P = D_P = 0$.

2: Toric Equation $$Z = Z_y + \frac{(C_{xy})X^2}{1 + \sqrt{1 - (C_{xy})^2 X^2}} \quad C_{xy} = \frac{1}{(1/C_x) - Z_y} \quad Z_y = \quad (3)$$
$$\frac{(C_y)Y^2}{1 + \sqrt{1 - (1 + K_y)(C_y)^2 Y^2}} + B_4 Y^4 + B_6 Y^6 + B_8 Y^8 + B_{10} Y^{10}$$

where, Z is the SAG of any point on the lens surface in the direction of the optical axis to a tangential plane at the point 0; $C_x$ and $C_y$ are curvatures in the X direction and the Y direction respectively; $K_y$ is the conic coefficient in the Y direction; $B_4$, $B_6$, $B_8$ and $B_{10}$ are the 4th, 6th, 8th and 10th order deformations from the conic respectively.

To maintain a constant scanning speed of the scanning light on the imaging surface of the target, for example, to maintain an equal distance between two spots in two equal time intervals, the two-element fθ lens with short focal distance in accordance with the present invention can correct the exit angles of the scanning lights in a range from the scanning light 113a to the scanning light 113b by using the first lens 131 and the second lens 132, so that after the exit angle is corrected, the distance between two spots formed on the drum 15 by the two scanning lights in two equal time intervals is equal, so as to uniformize the spot size imaged on the drum 15 (or limit the spot size within a range in compliance with the resolution requirement) to obtain the best resolution effect.

The two-element fθ lens with short focal distance in accordance with the present invention comprises a first lens 131 and a second lens 132 along an optical axis from a polygon mirror 10 side to a target side, wherein the first lens 131 has a first optical surface 131a and a second optical surface 131b, and the second lens 132 has a third optical surface 131a and a fourth optical surface 131b. In the main scanning direction of the optical axis, the first lens is a positive refractive power meniscus lens, and the second lens is a negative refractive power meniscus lens, and concave surfaces of the first, second and third optical surfaces 131a, 131b, 132a face towards the side of the polygon mirror 10, and the fourth optical surface 132b has an inflection point in SAG counted from the optical axis to peripheral portion and its concave surface faces towards the side of the polygon mirror 10 for converting a spot of each scanning light reflected from the polygon mirror 10 having a nonlinear relationship between angular velocity and time into a spot of the scanning light having a linear relationship between distance and time. After the optical distortion is corrected, the scanning light is focused on the target. The first optical surface 131a, second optical surface 131b, third optical surface 132a and fourth optical surface 132b in the main scanning direction are aspherical surfaces. In addition, at least one of the first optical surface 131a, second optical surface 131b, third optical surface 132a and fourth optical surface 132b in the sub scanning direction is an aspherical surface. Further, the optical design for air spaces and maximum effective window angle β of the first lens 131 and the second lens 132 of the two-element fθ lens satisfies the conditions of Equations (4) and (5):

$$0.6 \leq \frac{d_1 + d_3 + d_5}{f_s} \leq 2.0 \quad (4)$$

$$0.4557 \leq \tan(\beta) \leq 0.7265 \quad (5)$$

and further satisfies the condition of Equation (6) in the main scanning direction:

$$0.22 \leq f_s \cdot \left( \frac{(n_{d1} - 1)}{f_{(1)Y}} + \frac{(n_{d2} - 1)}{f_{(2)Y}} \right) \leq 1.2 \quad (6)$$

and satisfies the condition of Equation (7) in the sub scanning direction:

$$-2.82 \leq f_s \cdot \left( \frac{(n_{d1} - 1)}{f_{(1)X}} + \frac{(n_{d2} - 1)}{f_{(2)X}} \right) \leq -0.31 \quad (7)$$

wherein $d_1$ is a distance from a reflecting surface of the polygon mirror 10 on the optical axis to the side of the polygon mirror 10 of the first lens 131; $d_3$ is a distance from an optical surface on the target side of the first lens 131 on the optical axis to an optical surface on the side of the polygon mirror 10 of the second lens 132; $d_5$ is a distance from an optical surface on the target side of the second lens 132 on the optical axis to the target; $f_s$ is a composition focal length of the two-element fθ lens; β is a maximum effective window angle; $f_{(1)Y}$ is a focal length of the first lens 131 in the main scanning direction; $f_{(2)Y}$ is a focal length of the second lens 132 in the main scanning direction; $f_{(1)X}$ is a focal length of the first lens 131 in the sub scanning direction; $f_{(2)X}$ is a focal length of the second lens 132 in the sub scanning direction; and $n_{d1}$ and $n_{d2}$ are refraction indexes of the first lens 131 and the second lens 132 respectively.

The resolution provided by the two-element fθ lens of the present invention can be represented by ratio values $\eta_{max}$ and $\eta_{min}$, wherein $\eta_{max}$ is a ratio of the maximum value of the size of a geometric spot formed onto the drum 15 to the size of a geometric spot of a scanning light formed on a reflecting surface of the polygon mirror 10, and $\eta_{min}$ is a ratio of the minimum value of the size of a geometric spot scanned onto the drum 15 to the size of a geometric spot of a scanning light formed on a reflecting surface of the polygon mirror 10, and $\eta_{max}$ and $\eta_{min}$ satisfy Equations (8) and (9) respectively:

$$\eta_{max} = \frac{\max(S_b \cdot S_a)}{(S_{b0} \cdot S_{a0})} \leq 0.05 \qquad (8)$$

$$\eta_{min} = \frac{\min(S_b \cdot S_a)}{(S_{b0} \cdot S_{a0})} \leq 0.005 \qquad (9)$$

where, $S_a$ and $S_b$ are root mean square radii of any spot formed by the scanning light on the drum 15 in the sub scanning direction and the main scanning direction respectively; $\eta$ is the ratio value of the spot of the scanning light on the reflection surface of the polygon mirror 10 and the spot on the drum 15; and $S_{a0}$ and $S_{b0}$ are root mean square radii of the spots formed on a reflection surface of the polygon mirror 10 by the scanning lights in the sub scanning direction and the main scanning direction respectively.

To make it easier for our examiner to understand the technical characteristics of the present invention, we use the preferred embodiments accompanied with related drawings for the detailed description of the invention as follows.

The preferred embodiments of the present invention as disclosed below illustrating the major components of the two-element fθ lens with short focal distance for laser scanning unit, and thus the preferred embodiments can be applied to a laser scanning unit having a polygon mirror. In addition to the elements disclosed in the two-element fθ lens of the present invention, other structures are prior art well known by persons ordinarily skilled in the art. The two-element fθ lens for the laser scanning unit disclosed in the present invention are not limited to those disclosed in the preferred embodiments only, but modifications, alternatives and equivalents are intended to be covered in the scope of the present invention. For example, the design of radius of curvature, the selection of material, and the interval adjustment of the first lens 131 and the second lens 132 are not limited to the following preferred embodiments only. To facilitate the illustration and comparison, the following preferred embodiments adopt the root mean square spot radii of scanning lights formed on polygon mirror 10 in the X direction and the Y direction to $S_{a0}$=47.89 (μm) and $S_{b0}$=641.49 (μm) respectively, but the invention is not limited to such design only.

Figure 6:
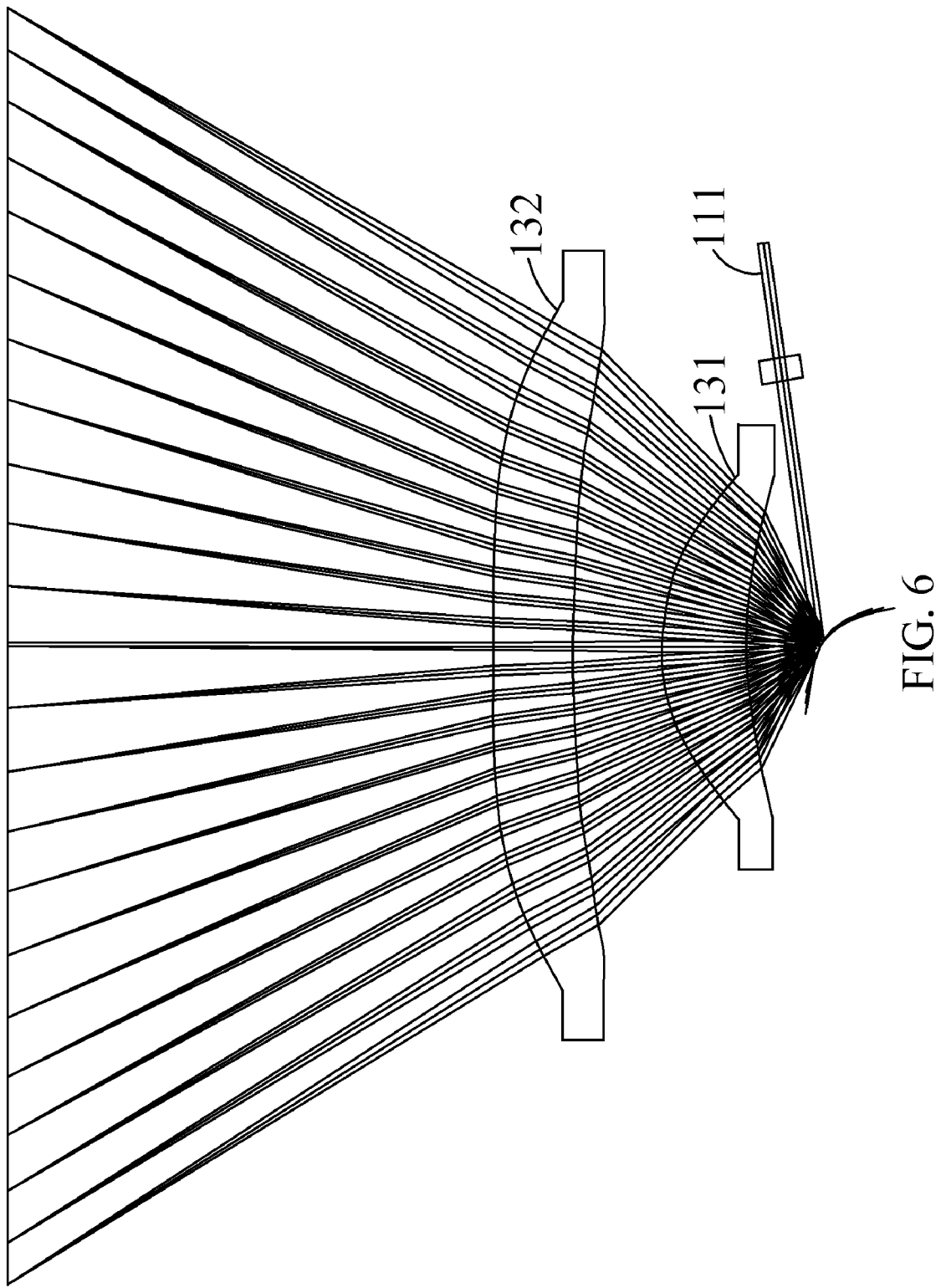
FIG. 6 shows an optical path chart of each preferred embodiment of the present invention.

In the first preferred embodiment, the second optical surface 131b of the first lens 131 and the third optical surface 132a of the second lens 132 of the two-element fθ lens of this preferred embodiment are aspherical surfaces, and the aspherical surface equation (2) is used for designing the optical surfaces. The first optical surface 131a of the first lens 131 and the fourth optical surface 132b of the second lens 132 in the main scanning direction are aspherical surfaces, and the aspherical surface equation (3) is used for designing the optical surfaces. The optical properties and aspherical surface parameters are listed in Tables 1 and 2, and the optical path chart is shown in FIG. 6, wherein the inflection point of the fourth optical surface 132b is situated at $\psi$=2.33°.

TABLE 1

List of Optical Properties of fθ Lens of First Preferred Embodiment
fs = 104.496

| Optical Surface | Radius (mm) | Thickness d (mm) | Refraction Index nd |
|---|---|---|---|
| Reflecting Mirror | | | |
| R0 | ∞ | 13.00 | 1 |
| Lens 1 | | | 1.607 |
| R1(Toric) | | | |
| R1x | −4.920 | 14.85 | |
| R1y* | −79.762 | | |
| R2(Anamorphic) | | | |
| R2x* | −66.614 | 15.29 | |
| R2y* | −33.747 | | |
| lens 2 | | | 1.607 |
| R3(Anamorphic) | | | |
| R3x* | 21.409 | 14.00 | |
| R3y* | −301.181 | | |
| R4(Toric) | | | |
| R4x | −34.975 | 85.00 | |
| R4y* | 28620.460 | | |
| drum R5 | ∞ | 0.00 | |

*aspherical surface

TABLE 2

List of Aspherical Surface Parameters of First Preferred Embodiment

| | Toric Equation Coefficient | | | | |
|---|---|---|---|---|---|
| Optical Surface | Conic Coefficient (Ky) | $4^{th}$ Order Coefficient (B4) | $6^{th}$ Order Coefficient (B6) | $8^{th}$ Order Coefficient (B8) | $10^{th}$ Order Coefficient (B10) |
| R1* | 2.9305E+00 | 1.3427E−06 | −6.6808E−11 | 2.6125E−12 | −5.1296E−16 |
| R4* | −1.0824E+07 | −1.5662E−06 | 3.5370E−10 | −8.6781E−14 | 6.5790E−18 |
| | Anamorphic Equation Coefficient | | | | |
| Optical Surface | Conic Coefficient (Ky) | $4^{th}$ Order Coefficient (AR) | $6^{th}$ Order Coefficient (BR) | $8^{th}$ Order Coefficient (CR) | $10^{th}$ Order Coefficient (DR) |

TABLE 2-continued

List of Aspherical Surface Parameters of First Preferred Embodiment

| | | | | | |
|---|---|---|---|---|---|
| R2* | −1.5335E−01 | −6.5928E−07 | −6.5757E−07 | 6.2083E−13 | 2.2405E−14 |
| R3* | −4.4569E+02 | −3.5320E−06 | 1.3935E−11 | 0.0000E+00 | 0.0000E+00 |

| | Conic Coefficient (Kx) | $4^{th}$ Order Coefficient (AP) | $6^{th}$ Order Coefficient (BP) | $8^{th}$ Order Coefficient (CP) | $10^{th}$ Order Coefficient (DP) |
|---|---|---|---|---|---|
| R2* | 3.2926E+01 | −2.3678E+00 | −8.2772E−01 | 5.8671E−01 | −4.8229E−01 |
| R3* | −1.9693E+01 | −4.7219E−01 | 1.4737E+00 | 0.0000E+00 | 0.0000E+00 |

Figure 7:
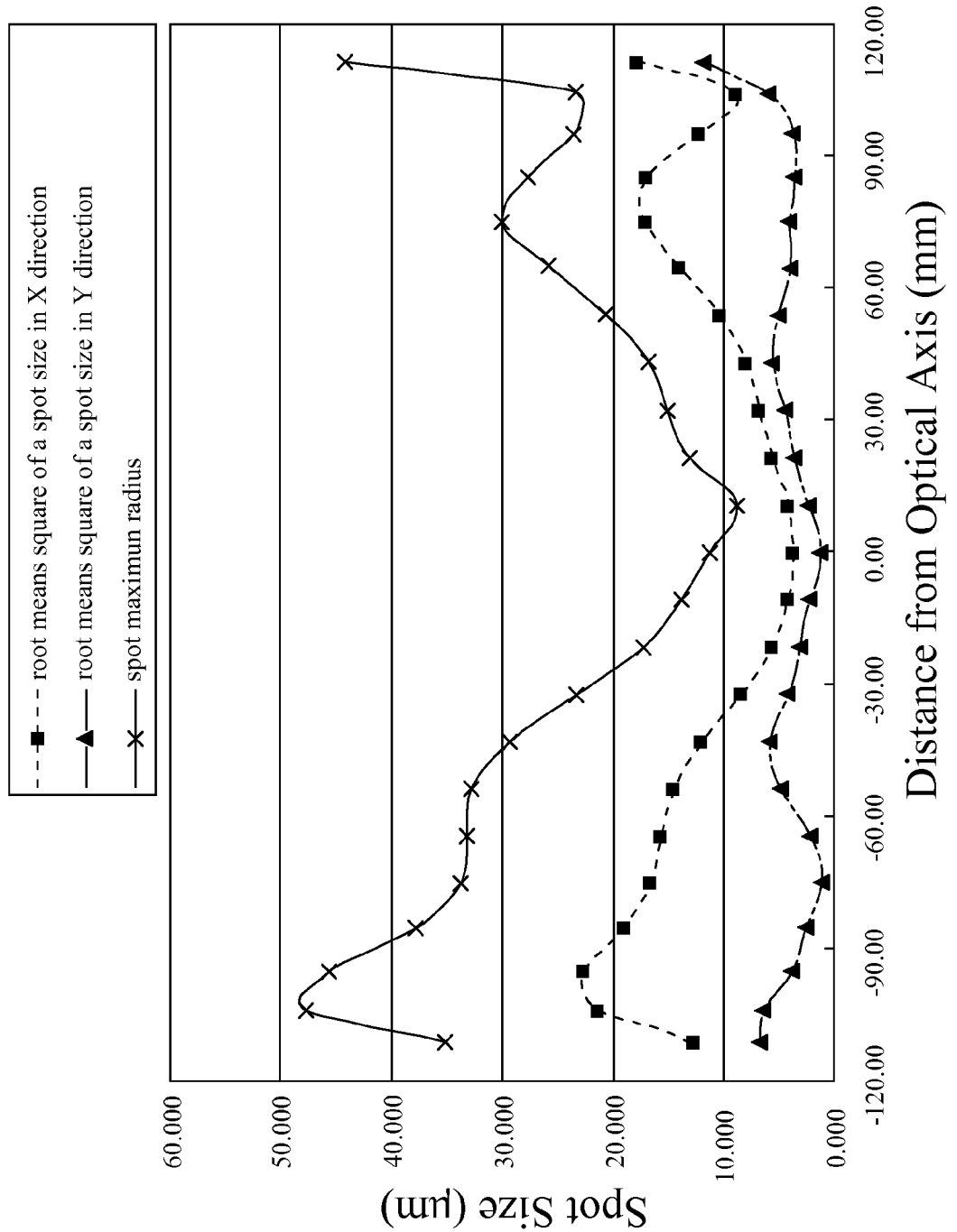
FIG. 7 is a schematic view showing the sizes of spots at different positions of a target in accordance with a first preferred embodiment of the present invention.
Figure 8:
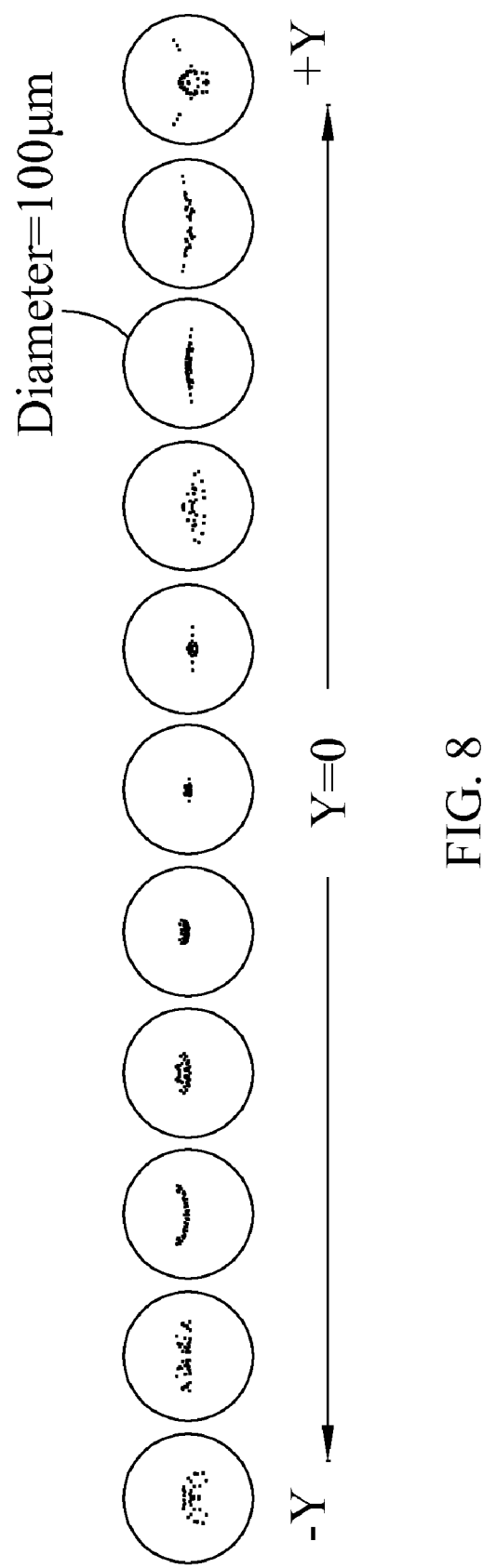
FIG. 8 is a distribution chart of spots on a drum in accordance with a first preferred embodiment of the present invention.

The optical surface of the two-element fθ lens thus constructed of $f_{(1)y}=88.111$, $f_{(2)y}=-502.724$, $f_{(1)x}=-9.844$, $f_{(2)x}=24.685$ (mm), and $y_a=85.00$, $y_b=50.44$ (mm) allows for a maximum window angle β=30.68°, such that a spot on the polygon mirror 10 can be scanned to form and focus a scanning light onto a drum 15 to form a smaller spot 6 and satisfies the conditions of Equations (4)~(7) and Equations (8)~(9), as shown in Table 3. The RMS spot radius of the scanning light scanned in a Y direction from the central axis (Z-axis) onto the drum 15 and the spot radius (μm) of the geometric spot scanned at a distance (mm) from the central axis are listed in Table 4, and the spot distribution and spot size of this preferred embodiment are shown in FIGS. 7 and 8.

TABLE 3

List of Conditions Satisfied by First Preferred Embodiment

| | |
|---|---|
| $\dfrac{d_1 + d_3 + d_5}{f_s}$ | 1.0842 |
| $\tan(\beta) = \dfrac{y_b}{y_a}$ | 0.5934 |
| main scanning direction $f_s \cdot \left( \dfrac{(n_{d1}-1)}{f_{(1)y}} + \dfrac{(n_{d2}-1)}{f_{(2)y}} \right)$ | 0.5937 |
| sub scanning direction $f_s \cdot \left( \dfrac{(n_{d1}-1)}{f_{(1)x}} + \dfrac{(n_{d2}-1)}{f_{(2)x}} \right)$ | −0.5933 |
| $\eta_{max} = \dfrac{\max(S_b \cdot S_a)}{(S_{b0} \cdot S_{a0})}$ | 0.0068 |
| $\eta_{min} = \dfrac{\min(S_b \cdot S_a)}{(S_{b0} \cdot S_{a0})}$ | 0.00014 |

In the second preferred embodiment, the second optical surface 131b of the first lens 131 and the third optical surface 132a of the second lens 132 of the two-element fθ lens of this preferred embodiment are aspherical surfaces, and the aspherical surface equation (2) is used for designing the optical surfaces. The first optical surface 131a of the first lens 131 and the fourth optical surface 132b of the second lens 132 in the main scanning direction are aspherical surfaces, and the aspherical surface equation (3) is used for designing the optical surfaces. The optical properties and aspherical surface parameters are listed in Tables 5 and 6, and the optical path chart is shown in FIG. 6, wherein the inflection point of the fourth optical surface 132b is situated at ψ=8.21°.

TABLE 5

List of Optical Properties of fθ Lens of Second Preferred Embodiment
fs = 107.243

| Optical Surface | Radius (mm) | Thickness d (mm) | Refraction Index nd |
|---|---|---|---|
| Reflecting Minor | | | |
| R0 | ∞ | 13.00 | 1 |
| lens 1 | | | 1.607 |
| R1(Toric) | | | |
| R1x | −4.029 | 18.22 | |
| R1y* | −84.245 | | |
| R2(Anamorphic) | | | |
| R2x* | −81.396 | 18.08 | |
| R2y* | −33.880 | | |
| lens 2 | | | 1.607 |
| R3(Anamorphic) | | | |
| R3x* | 21.139 | 16.68 | |
| R3y* | −224.690 | | |
| R4(Toric) | | | |
| R4x | −45.974 | 82.00 | |
| R4y* | 1756.471 | | |
| drum R5 | ∞ | 0.00 | |

*aspherical surface

TABLE 4

List of Maximum Spot Radius and Root Means Square Spot Radius of First Preferred Embodiment

| Y(mm) | 111.33 | 104.17 | 95.08 | 85.35 | 75.14 | 64.61 | 53.91 | 43.12 | 32.32 | 21.54 | 10.77 | 0.00 |
|---|---|---|---|---|---|---|---|---|---|---|---|---|
| Max. Spot Radius (μm) | 44.273 | 23.439 | 23.600 | 27.831 | 30.062 | 26.041 | 20.630 | 16.922 | 15.161 | 13.065 | 8.853 | 11.288 |
| RMS Spot Radius (μm) | 21.364 | 10.720 | 12.741 | 17.380 | 17.597 | 14.529 | 11.489 | 9.703 | 8.034 | 6.569 | 4.751 | 3.890 |

TABLE 6

List of Aspherical Surface Parameters of Second Preferred Embodiment

Toric Equation Coefficient

| Optical Surface | Conic Coefficient (Ky) | $4^{th}$ Order Coefficient (B4) | $6^{th}$ Order Coefficient (B6) | $8^{th}$ Order Coefficient (B8) | $10^{th}$ Order Coefficient (B10) |
|---|---|---|---|---|---|
| R1* | 3.6759E+00 | 1.4353E−06 | 4.9787E−10 | 1.0286E−12 | −3.6999E−15 |
| R4* | 5.0611E+02 | −2.0001E−06 | 2.6404E−10 | −2.1442E−14 | −2.2304E−18 |

Anamorphic Equation Coefficient

| Optical Surface | Conic Coefficient (Ky) | $4^{th}$ Order Coefficient (AR) | $6^{th}$ Order Coefficient (BR) | $8^{th}$ Order Coefficient (CR) | $10^{th}$ Order Coefficient (DR) |
|---|---|---|---|---|---|
| R2* | −1.7467E−01 | −1.9135E−08 | −2.1276E−08 | 3.4771E−13 | 1.4696E−14 |
| R3* | −1.9674E+02 | −1.8393E−06 | 1.4633E−11 | −2.8590E−14 | 0.0000E+00 |

| | Conic Coefficient (Kx) | $4^{th}$ Order Coefficient (AP) | $6^{th}$ Order Coefficient (BP) | $8^{th}$ Order Coefficient (CP) | $10^{th}$ Order Coefficient (DP) |
|---|---|---|---|---|---|
| R2* | 8.5248E+01 | −2.1828E+00 | −7.9475E−01 | 4.3745E−01 | −4.3342E−01 |
| R3* | −1.0371E+01 | −3.1783E−01 | 1.5598E+00 | −6.7943E−02 | 0.0000E+00 |

Figure 9:
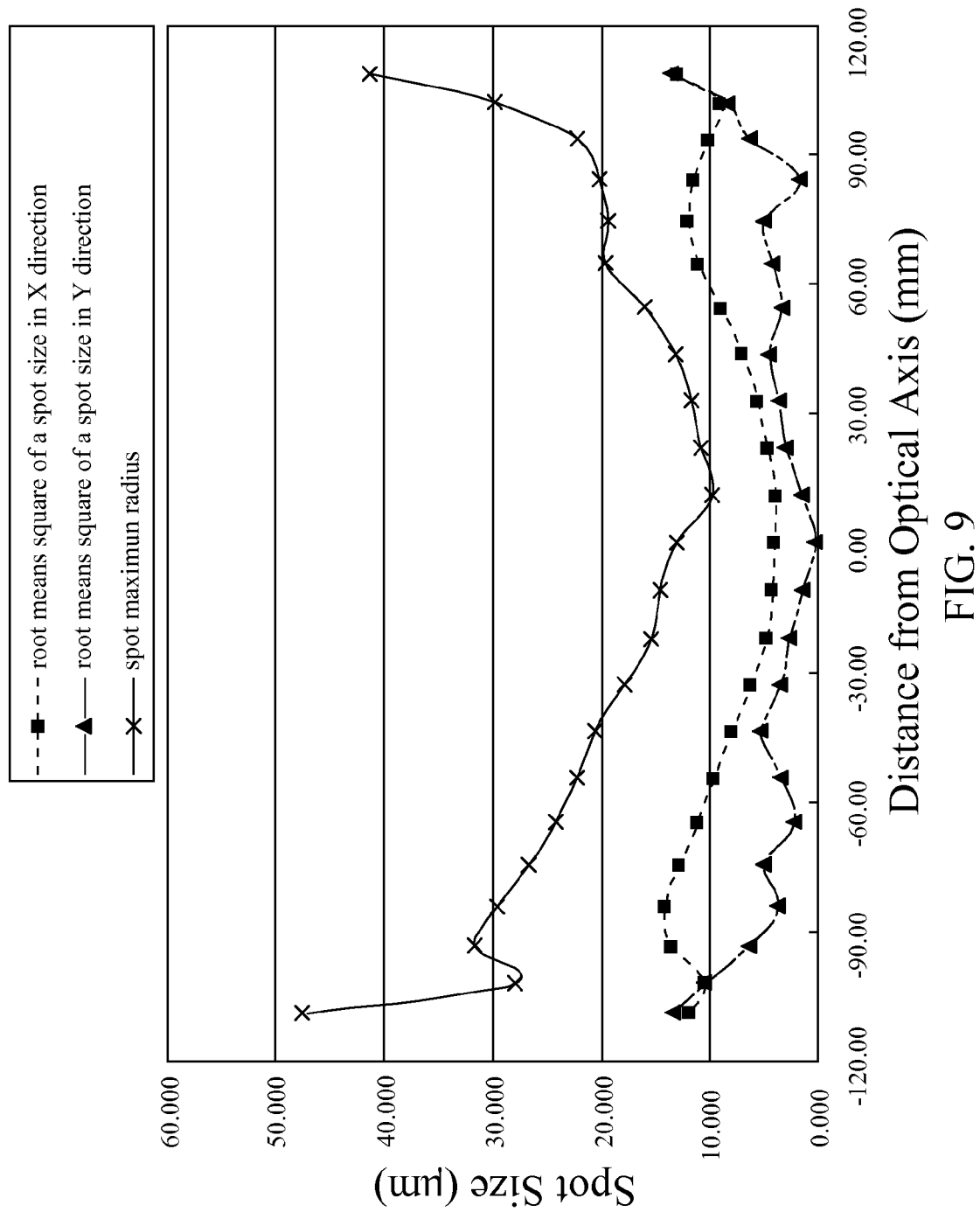
FIG. 9 is a schematic view showing the sizes of spots at different positions of a target in accordance with a second preferred embodiment of the present invention.
Figure 10:
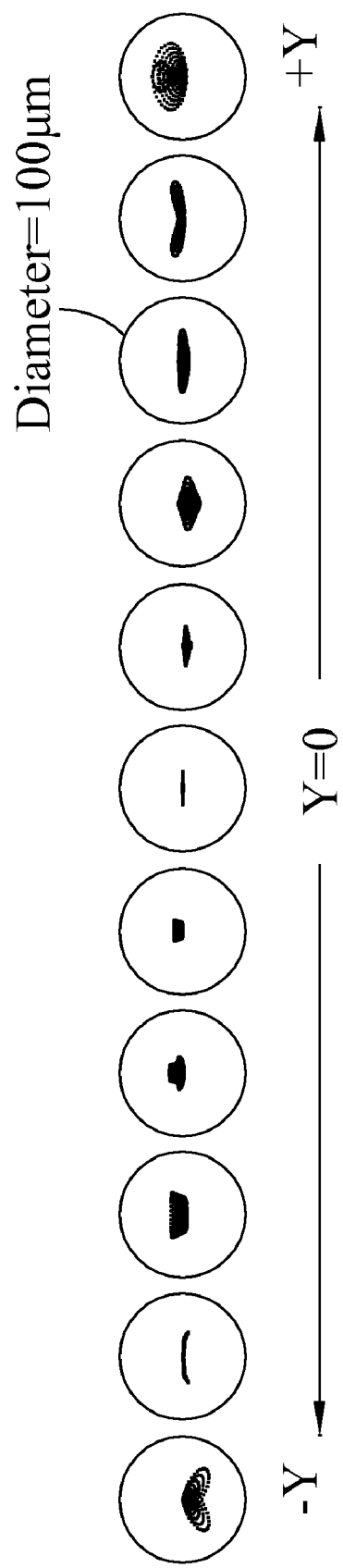
FIG. 10 is a distribution chart of spots on a drum in accordance with a second preferred embodiment of the present invention.

The optical surface of the two-element fθ lens thus constructed of $f_{(1)Y}=84.264$, $f_{(2)Y}=-335.022$, $f_{(1)X}=-7.838$, $f_{(2)X}=26.919$ (mm), and $y_a=82.0$, $y_b=43.0$ (mm) allows for a maximum window angle $\beta=27.67°$, such that a spot on the polygon mirror 10 can be scanned to form and focus a scanning light onto a drum 15 to form a smaller spot 6 and satisfies the conditions of Equations (4)~(7) and Equations (8)~(9), as shown in Table 7. The RMS spot radius of the scanning light scanned in a Y direction from the central axis (Z-axis) onto the drum 15 and the spot radius (μm) of the geometric spot scanned at a distance (mm) from the central axis are listed in Table 8 and the spot distribution and spot size of this preferred embodiment are shown in FIGS. 9 and 10.

TABLE 7

List of Conditions Satisfied by Second Preferred Embodiment

| | |
|---|---|
| $\dfrac{d_1 + d_3 + d_5}{f_s}$ | 1.0544 |

TABLE 7-continued

List of Conditions Satisfied by Second Preferred Embodiment

| | |
|---|---|
| $\tan(\beta) = \dfrac{y_b}{y_a}$ | 0.5244 |
| main scanning direction $f_s \cdot \left( \dfrac{(n_{d1} - 1)}{f_{(1)y}} + \dfrac{(n_{d2} - 1)}{f_{(2)y}} \right)$ | 0.5782 |
| sub scanning direction $f_s \cdot \left( \dfrac{(n_{d1} - 1)}{f_{(1)X}} + \dfrac{(n_{d2} - 1)}{f_{(2)X}} \right)$ | −0.7319 |
| $\eta_{max} = \dfrac{\max(S_b \cdot S_a)}{(S_{b0} \cdot S_{a0})}$ | 0.0057 |
| $\eta_{min} = \dfrac{\min(S_b \cdot S_a)}{(S_{b0} \cdot S_{a0})}$ | 0.000031 |

TABLE 8

List of Maximum Spot Radius and Root Means Square Spot Radius of Second Preferred Embodiment

| Y(mm) | 108.48 | 101.85 | 93.26 | 84.11 | 74.55 | 64.61 | 54.31 | 43.71 | 32.91 | 22.00 | 11.03 | 0.00 |
|---|---|---|---|---|---|---|---|---|---|---|---|---|
| Max. Spot Radius (μm) | 41.431 | 29.765 | 22.171 | 20.170 | 19.319 | 19.557 | 16.021 | 13.168 | 11.812 | 10.795 | 9.687 | 13.090 |
| RMS Spot Radius | 18.786 | 12.365 | 11.890 | 11.653 | 13.030 | 11.844 | 9.667 | 8.341 | 6.689 | 5.504 | 4.212 | 4.075 |

In the third first preferred embodiment, the second optical surface 131b of the first lens 131 and the third optical surface 132a of the second lens 132 of the two-element fθ lens of this preferred embodiment are aspherical surfaces, and the aspherical surface equation (2) is used for designing the optical surfaces. The first optical surface 131a of the first lens 131 and the fourth optical surface 132b of the second lens 132 in the main scanning direction are aspherical surfaces, and the aspherical surface equation (3) is used for designing the optical surfaces. The optical properties and aspherical surface parameters are listed in Tables 9 and 10, and the optical path chart is shown in FIG. 6, wherein the inflection point of the fourth optical surface 132b is situated at $\psi=6.57°$.

Figure 11:
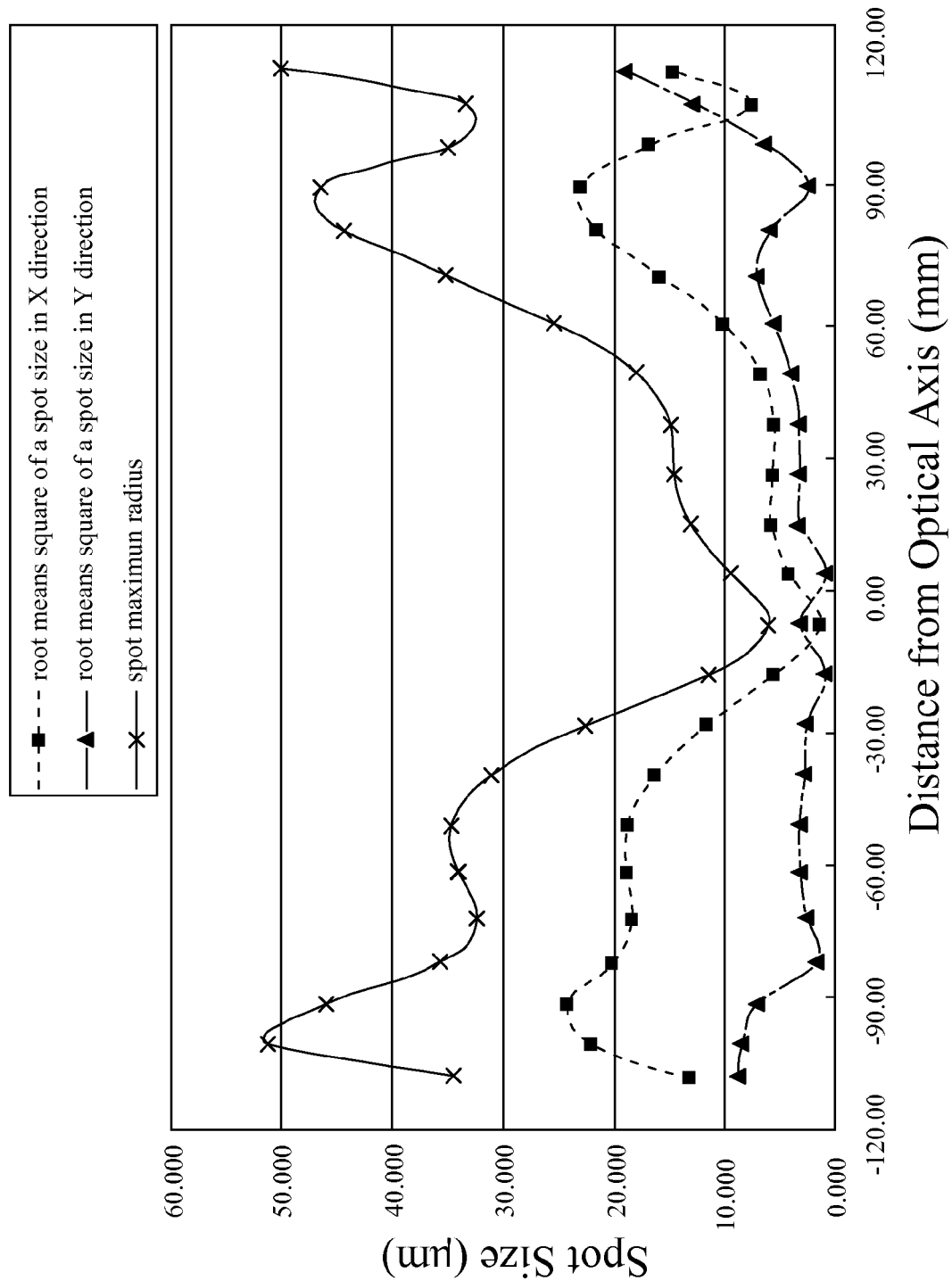
FIG. 11 is a schematic view showing the sizes of spots at different positions of a target in accordance with a third preferred embodiment of the present invention.
Figure 12:
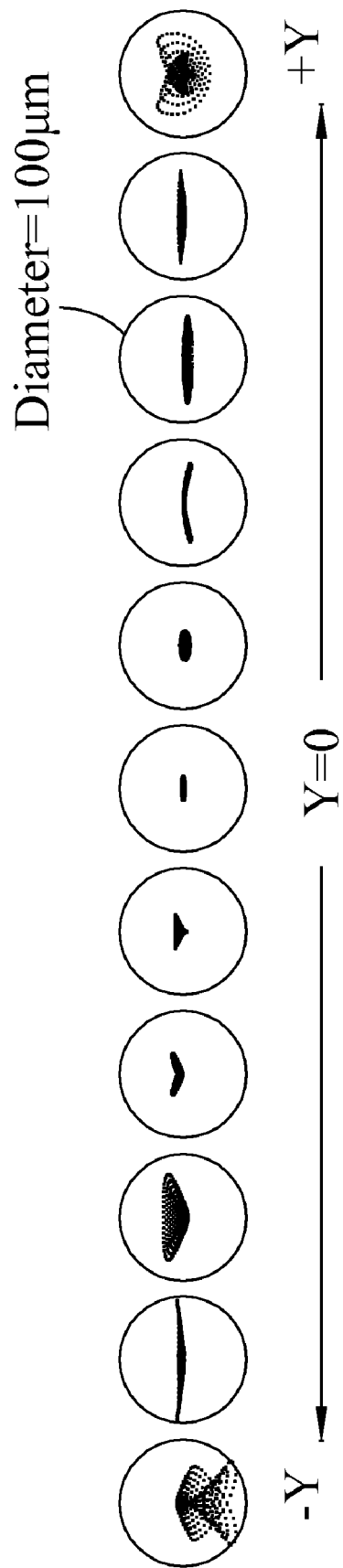
FIG. 12 is a distribution chart of spots on a drum in accordance with a third preferred embodiment of the present invention.

The optical surface of the two-element fθ lens thus constructed of $f_{(1)Y}=83.522$, $f_{(2)Y}=-357.438$, $f_{(1)X}=-12.477$, $f_{(2)X}=-357.434$ (mm), and $y_a=85.0$ (mm), $y_b=42.474$ (mm) allows for a maximum window angle $\beta=28.74°$, such that a spot on the polygon mirror 10 can be scanned to form and focus a scanning light onto a drum 15 to form a smaller spot 6 and satisfies the conditions of Equations (4)~(7) and Equations (8)~(9), as shown in Table 11. The RMS spot radius of the scanning light scanned in a Y direction from the central axis (Z-axis) onto the drum 15 and the spot radius (μm) of the geometric spot scanned at a distance (mm) from the central axis are listed in Table 12 and the spot distribution and spot size of this preferred embodiment are shown in FIGS. 11 and 12.

TABLE 9

List of Optical Properties of fθ Lens of Third Preferred Embodiment
fs = 105.578

| Optical Surface | Radius (mm) | Thickness d (mm) | Refraction Index nd |
|---|---|---|---|
| Reflecting minor | | | |
| R0 | ∞ | 13.00 | 1 |
| lens 1 | | | 1.607 |
| R1(Toric) | | | |
| R1x | −5.631 | 14.27 | |
| R1y* | −55.794 | | |
| R2(Anamorphic) | | | |
| R2x* | −0.022 | 15.77 | |
| R2y* | −0.035 | | |
| lens 2 | | | 1.53 |
| R3(Anamorphic) | | | |
| R3x* | 0.061 | 14.00 | |
| R3y* | −0.005 | | |
| R4(Toric) | | | |
| R4x | −45.360 | 86.00 | |
| R4y* | 1662.466 | | |
| drum R5 | ∞ | 0.00 | |

*aspherical surface

TABLE 11

List of Conditions Satisfied by Third Preferred Embodiment

| | |
|---|---|
| $\dfrac{d_1 + d_3 + d_5}{f_s}$ | 1.0871 |
| $\tan(\beta) = \dfrac{y_b}{y_a}$ | 0.5485 |
| main scanning direction $f_s \cdot \left(\dfrac{(n_{d1} - 1)}{f_{(1)y}} + \dfrac{(n_{d2} - 1)}{f_{(2)y}}\right)$ | 0.6107 |
| sub scanning direction $f_s \cdot \left(\dfrac{(n_{d1} - 1)}{f_{(1)X}} + \dfrac{(n_{d2} - 1)}{f_{(2)X}}\right)$ | −0.4873 |
| $\eta_{max} = \dfrac{\max(S_b \cdot S_a)}{(S_{b0} \cdot S_{a0})}$ | 0.0090 |
| $\eta_{min} = \dfrac{\min(S_b \cdot S_a)}{(S_{b0} \cdot S_{a0})}$ | 0.00012 |

TABLE 10

List of Aspherical Surface Parameters of Third Preferred Embodiment

Toric Equation Coefficient

| Optical surface | Conic Coefficient (Ky) | 4th Order Coefficient (B4) | 6th Order Coefficient (B6) | 8th Order Coefficient (B8) | 10th Order Coefficient (B10) |
|---|---|---|---|---|---|
| R1* | 8.2892E−01 | 6.3003E−07 | 6.4180E−09 | −4.2546E−12 | 7.9560E−16 |
| R4* | −1.0346E+05 | −1.2246E−06 | 1.1243E−10 | −4.0453E−14 | −4.2043E−18 |

Anamorphic Equation Coefficient

| Optical surface | Conic Coefficient (Ky) | 4th Order Coefficient (AR) | 6th Order Coefficient (BR) | 8th Order Coefficient (CR) | 10th Order Coefficient (DR) |
|---|---|---|---|---|---|
| R2* | −2.9391E−01 | −1.3165E−07 | −1.5857E−07 | 2.2419E−11 | −1.0942E−15 |
| R3* | −7.9089E+01 | −5.9391E−07 | 2.1927E−11 | 1.4851E−11 | 0.0000E+00 |

| | Conic Coefficient (Kx) | 4th Order Coefficient (AP) | 6th Order Coefficient (BP) | 8th Order Coefficient (CP) | 10th Order Coefficient (DP) |
|---|---|---|---|---|---|
| R2* | 2.3080E+01 | −9.4909E−01 | −7.8391E−01 | −1.4477E+00 | 2.9754E−01 |
| R3* | −5.5319E−01 | 3.7625E−01 | 6.8341E−01 | −1.1667E+00 | 0.0000E+00 |

TABLE 12

List of Maximum Spot Radius and Root Means Square Spot Radius of Third Preferred Embodiment

| Y(mm) | 108.69 | 101.54 | 92.86 | 83.86 | 74.39 | 64.41 | 54.00 | 43.30 | 32.49 | 21.65 | 10.83 | 0.00 |
|---|---|---|---|---|---|---|---|---|---|---|---|---|
| Max. Spot Radius (μm) | 49.872 | 33.136 | 34.955 | 46.417 | 44.462 | 35.340 | 25.260 | 17.974 | 14.891 | 14.471 | 13.013 | 9.464 |
| RMS Spot Radius (μm) | 23.959 | 14.784 | 17.870 | 23.070 | 22.237 | 17.322 | 11.465 | 7.699 | 6.388 | 6.475 | 6.437 | 4.266 |

In the fourth preferred embodiment, the second optical surface 131b of the first lens 131 and the third optical surface 132a of the second lens 132 of the two-element fθ lens with short focal distance of this preferred embodiment are aspherical surfaces, and the aspherical surface equation (2) is used for designing the optical surfaces. The first optical surface 131a of the first lens 131 and the fourth optical surface 132b of the second lens 132 in the main scanning direction are aspherical surfaces, and the aspherical surface equation (3) is used for designing the optical surfaces. The optical properties and aspherical surface parameters are listed in Tables 13 and 14, and the optical path chart is shown in FIG. 6, wherein the inflection point of the fourth optical surface 132b is situated at $\psi=6.569°$.

TABLE 13

List of Optical Properties of fθ Lens of fourth Preferred Embodiment
fs = 136.712

| Optical Surface | Radius (mm) | Thickness d (mm) | Refraction Index nd |
|---|---|---|---|
| Reflecting mirror | | | |
| R0 | ∞ | 9.474877 | 1 |
| lens 1 | | | 1.53 |

TABLE 13-continued

List of Optical Properties of fθ Lens of fourth Preferred Embodiment
fs = 136.712

| Optical Surface | Radius (mm) | Thickness d (mm) | Refraction Index nd |
|---|---|---|---|
| R1(Toric) | | | |
| R1x | ∞ | 19.96142 | |
| R1y* | −57.830 | | |
| R2(Anamorphic) | | | |
| R2x* | 0.233 | 22.68977 | |
| R2y* | −35.417 | | |
| lens 2 | | | 1.53 |
| R3 (Anamorphic) | | | |
| R3x* | 11.516 | 17.98669 | |
| R3y* | −87030.233 | | |
| R4(Toric) | | | |
| R4x | −57.436 | 84.99915 | |
| R4y* | 2764.454 | | |
| drum R5 | ∞ | 0 | |

*aspherical surface

TABLE 14

List of Aspherical Surface Parameters of Fourth Preferred Embodiment

Toric Equation Coefficient

| Optical surface | Conic Coefficient (Ky) | 4th Order Coefficient (B4) | 6th Order Coefficient (B6) | 8th Order Coefficient (B8) | 10th Order Coefficient (B10) |
|---|---|---|---|---|---|
| R1* | 3.8678E+00 | −3.1521E−07 | −1.6862E−08 | 1.6560E−11 | 6.1808E−14 |
| R4* | −4.2644E+02 | −1.4146E−06 | 1.9625E−10 | −2.7882E−14 | 3.9289E−19 |

Anamorphic Equation Coefficient

| Optical surface | Conic Coefficient (Ky) | 4th Order Coefficient (AR) | 6th Order Coefficient (BR) | 8th Order Coefficient (CR) | 10th Order Coefficient (DR) |
|---|---|---|---|---|---|
| R2* | −8.8798E−01 | 1.0948E−08 | 8.7748E−09 | 7.0691E−12 | 0.0000E+00 |
| R3* | −1.6032E+07 | −6.6426E−07 | 7.4810E−11 | 0.0000E+00 | 0.0000E+00 |

| Optical surface | Conic Coefficient (Kx) | 4th Order Coefficient (AP) | 6th Order Coefficient (BP) | 8th Order Coefficient (CP) | 10th Order Coefficient (DP) |
|---|---|---|---|---|---|
| R2* | −9.9169E−01 | −7.3593E−01 | −1.2565E+00 | −3.7511E−01 | 0.0000E+00 |
| R3* | −1.6554E+00 | 1.0064E−01 | 6.1896E−02 | 0.0000E+00 | 0.0000E+00 |

Figure 13:
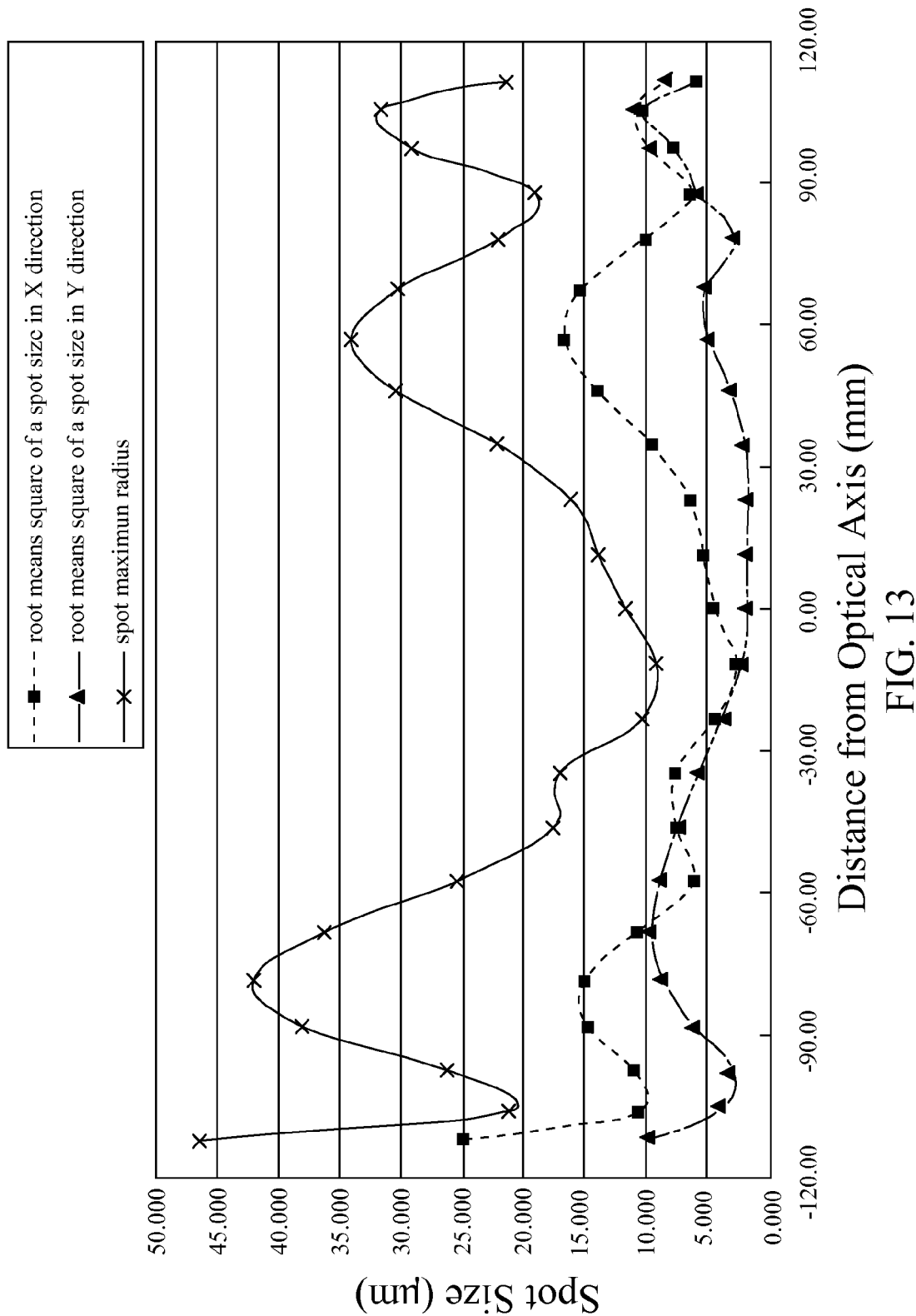
FIG. 13 is a schematic view showing the sizes of spots at different positions of a target in accordance with a fourth preferred embodiment of the present invention.
Figure 14:
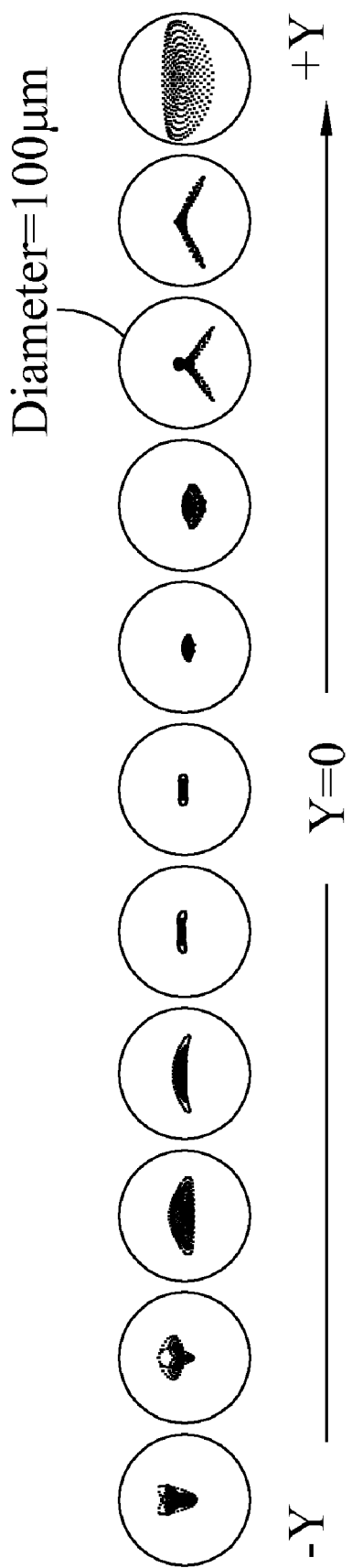
FIG. 14 is a distribution chart of spots on a drum in accordance with a fourth preferred embodiment of the present invention.

The optical surface of the two-element fθ lens thus constructed of $f_{(1)Y}=133.630$, $f_{(2)Y}=-5116.737$, $f_{(1)X}=-0.445$, $f_{(2)X}=20.124$ (mm), and $y_a=85.0$ (mm), $y_b=42.474$ (mm), allows for a maximum window angle $\beta=26.55°$, such that a spot on the polygon mirror 10 can be scanned to form and focus a scanning light onto a drum 15 to form a smaller spot 6 and satisfies the conditions of Equations (4)~(7) and Equations (8)~(9), as shown in Table 15. The RMS spot radius of the scanning light scanned in a Y direction from the central axis (Z-axis) onto the drum 15 and the spot radius (μm) of the geometric spot scanned at a distance (mm) from the central axis are listed in Table 16 and the spot distribution and spot size of this preferred embodiment are shown in FIGS. 13 and 14.

TABLE 15

List of Conditions Satisfied by Fourth Preferred Embodiment

| | |
|---|---|
| $\dfrac{d_1 + d_3 + d_5}{f_s}$ | 0.857 |
| $\tan(\beta) = \dfrac{y_b}{y_a}$ | 0.4997 |
| main scanning direction $f_s \cdot \left( \dfrac{(n_{d1} - 1)}{f_{(1)y}} + \dfrac{(n_{d2} - 1)}{f_{(2)y}} \right)$ | 0.5280 |
| sub scanning direction $f_s \cdot \left( \dfrac{(n_{d1} - 1)}{f_{(1)X}} + \dfrac{(n_{d2} - 1)}{f_{(2)X}} \right)$ | -2.0151 |
| $\eta_{max} = \dfrac{\max(S_b \cdot S_a)}{(S_{b0} \cdot S_{a0})}$ | 0.00814 |
| $\eta_{min} = \dfrac{\min(S_b \cdot S_a)}{(S_{b0} \cdot S_{a0})}$ | 0.000181 |

TABLE 16

List of Maximum Spot Radius and Root Means Square Spot Radius of Fourth Preferred Embodiment

| Y(mm) | 111.83 | 105.60 | 97.26 | 88.01 | 78.14 | 67.80 | 57.07 | 46.00 | 34.66 | 23.17 | 11.60 | 0.00 |
|---|---|---|---|---|---|---|---|---|---|---|---|---|
| Max. Spot Radius (μm) | 21.240 | 31.715 | 29.218 | 19.139 | 22.019 | 30.271 | 34.172 | 30.398 | 22.173 | 16.095 | 13.827 | 11.705 |
| RMS Spot Radius (μm) | 10.114 | 15.031 | 12.497 | 8.607 | 10.484 | 16.171 | 17.366 | 14.161 | 9.629 | 6.614 | 5.597 | 4.779 |

In the fifth preferred embodiment, the second optical surface 131b of the first lens 131 and the third optical surface 132a of the second lens 132 of the two-element fθ lens of this preferred embodiment are aspherical surfaces, and the aspherical surface equation (2) is used for designing the optical surfaces. The first optical surface 131a of the first lens 131 and the fourth optical surface 132b of the second lens 132 in the main scanning direction are aspherical surfaces, and the aspherical surface equation (3) is used for designing the optical surfaces. The optical properties and aspherical surface parameters are listed in Tables 17 and 18, and the optical path chart is shown in FIG. 6, wherein the inflection point of the fourth optical surface 132b is situated at $\psi=2.04°$.

TABLE 17

List of Optical Properties of fθ Lens of Fifth Preferred Embodiment
fs = 106.623

| Optical Surface | Radius (mm) | Thickness d (mm) | Refraction Index nd |
|---|---|---|---|
| Reflecting mirror | | | |
| R0 | ∞ | 13.00 | 1 |
| lens 1 | | | 1.529 |
| R1(Toric) | | | |
| R1x | -4.762 | 12.02 | |
| R1y* | -71.908 | | |
| R2(Anamorphic) | | | |
| R2x* | -59.216 | 19.75 | |
| R2y* | -31.894 | | |
| lens 2 | | | 1.529 |
| R3(Anamorphic) | | | |
| R3x* | 22.104 | 15.00 | |
| R3y* | -656.668 | | |
| R4(Toric) | | | |
| R4x | -29.368 | 85.00 | |
| R4y* | 31552.150 | | |
| drum R5 | ∞ | 0.00 | |

*aspherical surface

TABLE 18

List of Aspherical Surface Parameters of Fifth Preferred Embodiment

| | Toric Equation Coefficient | | | | |
|---|---|---|---|---|---|
| Optical surface | Conic Coefficient (Ky) | $4^{th}$ Order Coefficient (B4) | $6^{th}$ Order Coefficient (B6) | $8^{th}$ Order Coefficient (B8) | $10^{th}$ Order Coefficient (B10) |
| R1* | -4.1168E-01 | 2.4518E-06 | -9.4929E-10 | 1.0681E-12 | -3.8917E-16 |
| R4* | 2.1124E+05 | -1.7768E-06 | 3.0988E-10 | -5.5977E-14 | 5.5973E-18 |

TABLE 18-continued

List of Aspherical Surface Parameters of Fifth Preferred Embodiment

Anamorphic Equation Coefficient

| Optical surface | Conic Coefficient (Ky) | $4^{th}$ Order Coefficient (AR) | $6^{th}$ Order Coefficient (BR) | $8^{th}$ Order Coefficient (CR) | $10^{th}$ Order Coefficient (DR) |
|---|---|---|---|---|---|
| R2* | −7.0314E−02 | −3.5470E−07 | −3.3761E−07 | 9.0765E−13 | −2.1747E−15 |
| R3* | −1.1833E+03 | −2.2622E−06 | 3.3962E−11 | −1.3465E−14 | 0.0000E+00 |

| | Conic Coefficient (Kx) | $4^{th}$ Order Coefficient (AP) | $6^{th}$ Order Coefficient (BP) | $8^{th}$ Order Coefficient (CP) | $10^{th}$ Order Coefficient (DP) |
|---|---|---|---|---|---|
| R2* | 4.0241E+01 | −2.5804E+00 | −7.4487E−01 | 7.1919E−01 | −1.4223E−01 |
| R3* | 7.1215E−01 | −2.7546E−01 | 1.2719E+00 | 2.8732E−01 | 0.0000E+00 |

Figure 15:
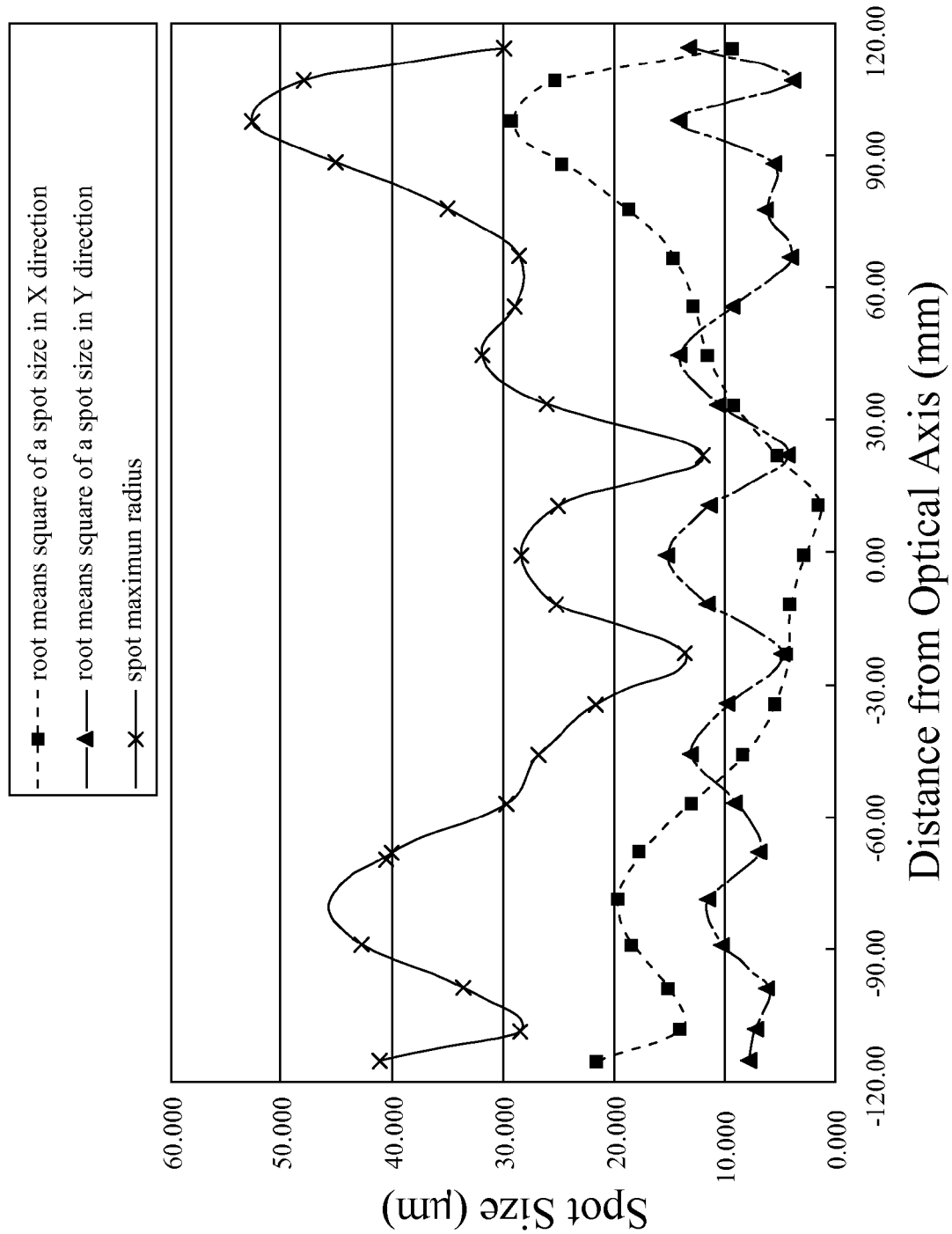
FIG. 15 is a schematic view showing the sizes of spots at different positions of a target in accordance with a fifth preferred embodiment of the present invention.
Figure 16:
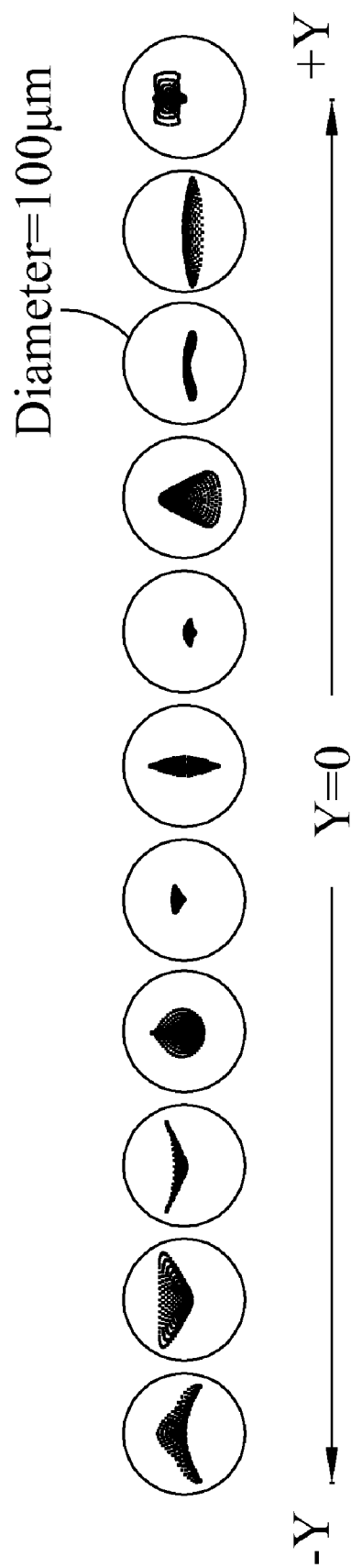
FIG. 16 is a distribution chart of spots on a drum in accordance with a fifth preferred embodiment of the present invention.

The optical surface of the two-element fθ lens thus constructed of $f_{(1)Y}=99.246$, $f_{(2)Y}=-1228.670$, $f_{(1)X}=-10.704$, $f_{(2)X}=106.623$ (mm), and $y_a=85.0$, $y_b=48.607$ (mm) allows for a maximum window angle $\beta=29.763°$, such that a spot on the polygon mirror 10 can be scanned to form and focus a scanning light onto a drum 15 to form a smaller spot 6 and satisfies the conditions of Equations (4)~(7) and Equations (8)~(9), as shown in Table 19. The RMS spot radius of the scanning light scanned in a Y direction from the central axis (Z-axis) onto the drum 15 and the spot radius (μm) of the geometric spot scanned at a distance (mm) from the central axis are listed in Table 20 and the spot distribution and spot size of this preferred embodiment are shown in FIGS. 15 and 16.

In the sixth preferred embodiment, the second optical surface 131b of the first lens 131 and the third optical surface 132a of the second lens 132 of the two-element fθ lens of this preferred embodiment are aspherical surfaces, and the aspherical surface equation (2) is used for designing the optical surfaces. The first optical surface 131a of the first lens 131 and the fourth optical surface 132b of the second lens 132 in the main scanning direction are aspherical surfaces, and the aspherical surface equation (3) is used for designing the optical surfaces. The optical properties and aspherical surface parameters are listed in Tables 21 and 22, and the optical path chart is shown in FIG. 6, wherein the inflection point of the fourth optical surface 132b is situated at $\psi=6.30°$.

TABLE 19

List of Conditions Satisfied by Fifth Preferred Embodiment

| | |
|---|---|
| $\dfrac{d_1 + d_3 + d_5}{f_s}$ | 1.1043 |
| $\tan(\beta) = \dfrac{y_b}{y_a}$ | 0.5718 |
| main scanning direction $f_s \cdot \left( \dfrac{(n_{d1}-1)}{f_{(1)y}} + \dfrac{(n_{d2}-1)}{f_{(2)y}} \right)$ | 0.5244 |
| sub scanning direction $f_s \cdot \left( \dfrac{(n_{d1}-1)}{f_{(1)x}} + \dfrac{(n_{d2}-1)}{f_{(2)x}} \right)$ | −0.4814 |
| $\eta_{max} = \dfrac{\max(S_b \cdot S_a)}{(S_{b0} \cdot S_{a0})}$ | 0.01344 |
| $\eta_{min} = \dfrac{\min(S_b \cdot S_a)}{(S_{b0} \cdot S_{a0})}$ | 0.00056 |

TABLE 21

List of Optical Properties of fθ Lens of Sixth Preferred Embodiment
fs = 108.723

| Optical Surface | Radius (mm) | Thickness d (mm) | Refraction Index nd |
|---|---|---|---|
| Reflecting minor | | | |
| R0 | ∞ | 13.00 | 1 |
| lens 1 | | | 1.607 |
| R1(Toric) | | | |
| R1x | −4.394 | 13.04 | |
| R1y* | −86.771 | | |
| R2(Toric) | | | |
| R2x | −82.542 | 14.07 | |
| R2y* | −33.029 | | |
| lens 2 | | | 1.607 |

TABLE 20

List of Maximum Spot Radius and Root Means Square Spot Radius of Fifth Preferred Embodiment

| Y(mm) | 115.12 | 108.01 | 98.77 | 88.80 | 78.39 | 67.63 | 56.57 | 45.28 | 33.90 | 22.54 | 11.25 | 0.00 |
|---|---|---|---|---|---|---|---|---|---|---|---|---|
| Max. Spot Radius (μm) | 30.150 | 48.116 | 52.759 | 45.202 | 35.000 | 28.726 | 28.962 | 32.006 | 26.083 | 11.988 | 25.026 | 28.435 |
| RMS Spot Radius (μm) | 16.133 | 25.633 | 32.494 | 25.285 | 19.714 | 15.197 | 15.850 | 18.292 | 14.008 | 6.776 | 11.509 | 15.508 |

TABLE 21-continued

List of Optical Properties of fθ Lens of Sixth Preferred Embodiment
fs = 108.723

| Optical Surface | Radius (mm) | Thickness d (mm) | Refraction Index nd |
|---|---|---|---|
| R3(Toric) | | | |
| R3x | 15.564 | 14.00 | |
| R3y* | −190.249 | | |
| R4(Toric) | | | |
| R4x | −51.951 | 82.30 | |
| R4y* | 2946.822 | | |
| drum R5 | ∞ | 0.00 | |

*aspherical surface

TABLE 22

List of Aspherical Surface Parameters of Sixth Preferred Embodiment

Toric Equation Coefficient

| Optical surface | Conic Coefficient (Ky) | 4th Order Coefficient (B4) | 6th Order Coefficient (B6) | 8th Order Coefficient (B8) | 10th Order Coefficient (B10) |
|---|---|---|---|---|---|
| R1* | 6.0002E+00 | 3.3192E−06 | 1.2607E−09 | 1.0300E−12 | −4.4902E−15 |
| R4* | −1.1308E+05 | −1.5191E−06 | 1.8602E−10 | −1.8431E−14 | −2.3503E−18 |

Anamorphic equation Coefficient

| Optical surface | Conic Coefficient (Ky) | 4th Order Coefficient (AR) | 6th Order Coefficient (BR) | 8th Order Coefficient (CR) | 10th Order Coefficient (DR) |
|---|---|---|---|---|---|
| R2* | −1.7860E−01 | −8.2127E−08 | −8.2127E−08 | 1.0795E−12 | 1.1565E−14 |
| R3* | −1.6576E+02 | −2.8763E−06 | 1.7306E−11 | −4.8275E−14 | 0.0000E+00 |

| | Conic Coefficient (Kx) | 4th Order Coefficient (AP) | 6th Order Coefficient (BP) | 8th Order Coefficient (CP) | 10th Order Coefficient (DP) |
|---|---|---|---|---|---|
| R2* | 5.3550E+01 | −2.7294E+00 | −7.0223E−01 | 6.4059E−01 | −3.9412E−01 |
| R3* | −8.5715E+00 | −2.4040E−01 | 1.2408E+00 | −7.4651E−02 | 0.0000E+00 |

Figure 17:
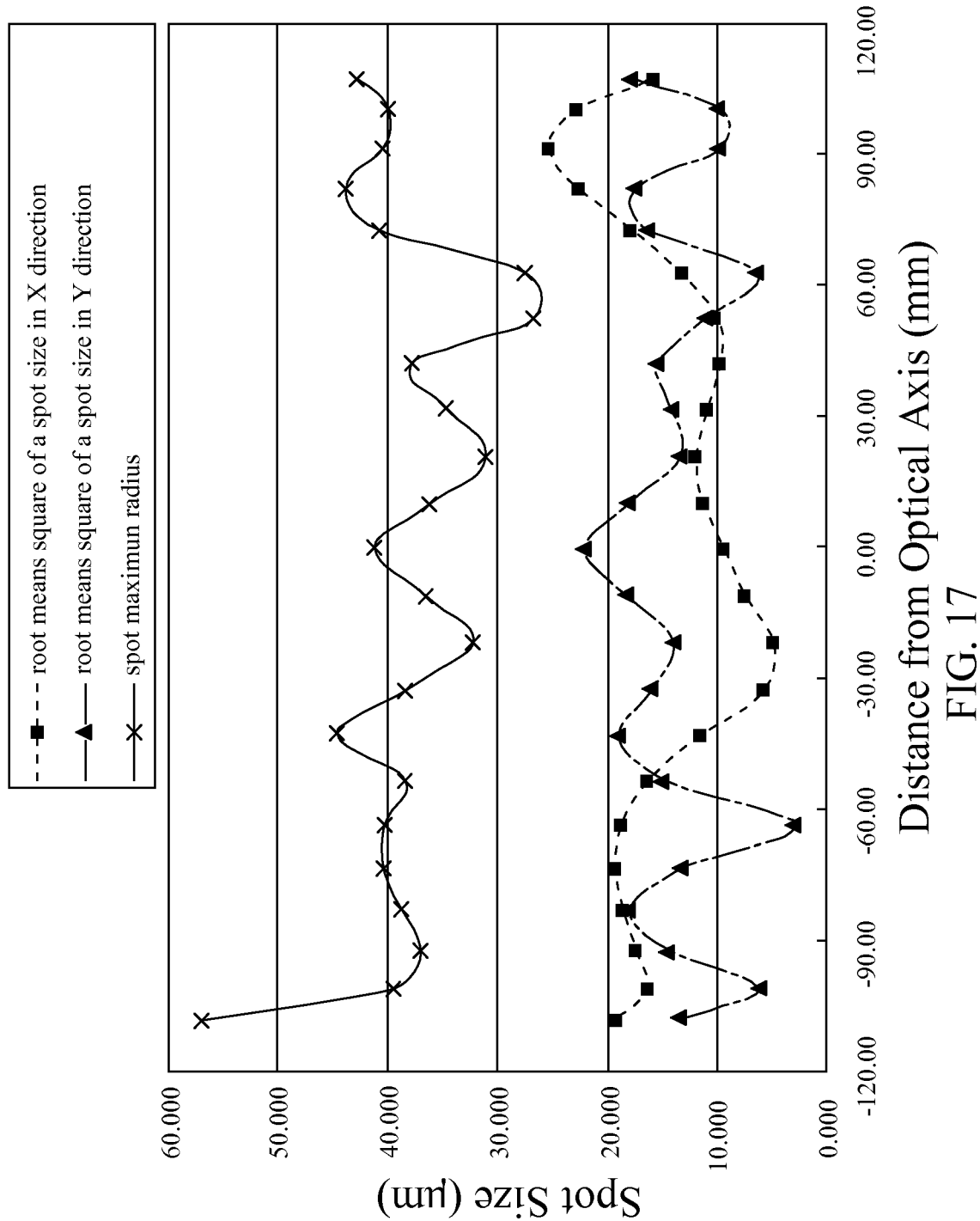
FIG. 17 is a schematic view showing the sizes of spots at different positions of a target in accordance with a sixth preferred embodiment of the present invention.
Figure 18:
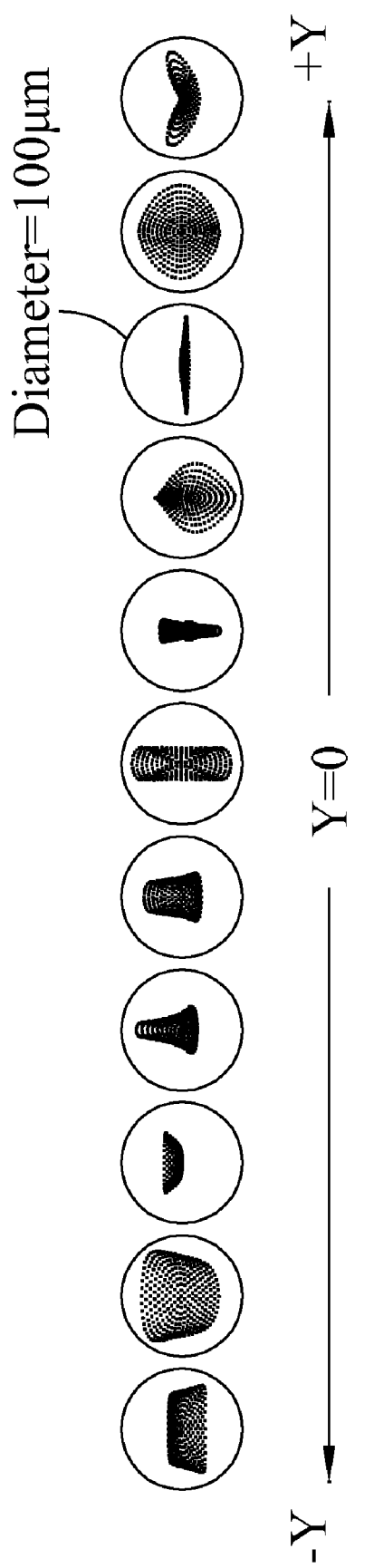
FIG. 18 is a distribution chart of spots on a drum in accordance with a sixth preferred embodiment of the present invention.

The optical surface of the two-element fθ lens thus constructed of $f_{(1)Y}=82.522$, $f_{(2)Y}=-300.994$, $f_{(1)X}=-8.349$, $f_{(2)X}=21.894$ (mm), and $y_a=82.3$, $y_b=49.273$ (mm) allows for a maximum window angle $\beta=30.908°$, such that a spot on the polygon mirror 10 can be scanned to form and focus a scanning light onto a drum 15 to form a smaller spot 6 and satisfies the conditions of Equations (4)~(7) and Equations (8)~(9), as shown in Table 23. The RMS spot radius of the scanning light scanned in a Y direction from the central axis (Z-axis) onto the drum 15 and the spot radius (μm) of the geometric spot scanned at a distance (mm) from the central axis are listed in Table 24 and the spot distribution and spot size of this preferred embodiment are shown in FIGS. 17 and 18.

TABLE 23

List of Conditions Satisfied by Sixth Preferred Embodiment

| | |
|---|---|
| $\dfrac{d_1 + d_3 + d_5}{f_s}$ | 1.0059 |
| $\tan(\beta) = \dfrac{y_b}{y_a}$ | 0.5987 |
| main scanning direction $f_s \cdot \left( \dfrac{(n_{d1} - 1)}{f_{(1)y}} + \dfrac{(n_{d2} - 1)}{f_{(2)y}} \right)$ | 0.5805 |
| sub scanning direction $f_s \cdot \left( \dfrac{(n_{d1} - 1)}{f_{(1)X}} + \dfrac{(n_{d2} - 1)}{f_{(2)X}} \right)$ | −0.6888 |

TABLE 23-continued

List of Conditions Satisfied by Sixth Preferred Embodiment

| | |
|---|---|
| $\eta_{max} = \dfrac{\max(S_b \cdot S_a)}{(S_{b0} \cdot S_{a0})}$ | 0.013 |
| $\eta_{min} = \dfrac{\min(S_b \cdot S_a)}{(S_{b0} \cdot S_{a0})}$ | 0.0018 |

TABLE 24

List of Maximum Spot Radius and Root Means Square Spot Radius of Sixth Preferred Embodiment

| Y(mm) | 108.08 | 100.97 | 92.04 | 82.79 | 73.28 | 63.42 | 53.21 | 42.74 | 32.14 | 21.48 | 10.77 | 0.00 |
|---|---|---|---|---|---|---|---|---|---|---|---|---|
| Max. Spot Radius (μm) | 42.858 | 40.183 | 40.685 | 44.021 | 40.863 | 27.672 | 26.997 | 37.934 | 34.844 | 31.244 | 36.475 | 41.309 |
| RMS Spot Radius (μm) | 23.917 | 25.004 | 27.291 | 28.749 | 24.341 | 14.703 | 15.048 | 18.295 | 17.885 | 18.044 | 21.372 | 24.101 |

In summation of the description above, the present invention has the following effects:

(1) With the two-element fθ lens with short focal distance in accordance with the present invention, the unequal scanning speed of the spots on the imaging surface of the polygon mirror is corrected to an equal scanning speed on the target so that the projection of the laser beam onto the image side can be used for a constant speed scanning to provide an equal interval between two adjacent spots formed on the target.

(2) With the two-element fθ lens with short focal distance in accordance with the present invention, the distortion of the scanning light in the main scanning direction and in the sub scanning direction can be corrected to reduce the spot sizes focused on the target.

(3) With the two-element fθ lens with short focal distance in accordance with the present invention, the distortion of the scanning light in the main scanning direction and in the sub scanning direction can be corrected to uniformize the spot sizes focused on the target.

(4) With the two-element fθ lens with short focal distance in accordance with the present invention, the focal distance can be shortened effectively to reduce the volume of the laser scanning unit, so as to achieve the miniaturization requirement.

While the invention has been described by means of specific embodiments, numerous modifications and variations could be made by those skilled in the art without departing from the scope and spirit of the invention set forth in the claims.

What is claimed is:

1. A two-element fθ lens with short focal distance, applied to a laser scanning unit, and said laser scanning unit including a light source for emitting a laser beam, a polygon mirror for scanning said laser beam to form a scanning light, and a target for sensing a light; and said two-element fθ lens with short focal distance along an optical axis from a polygon mirror side to a target side comprising, a first lens, in a meniscus shape, and having a concave surface toward said polygon mirror; and a second lens, in a meniscus shape, and having a concave surface toward said polygon mirror;

wherein, said first lens includes a first optical surface and a second optical surface, having positive refractive power in main scanning direction on optical axis of said laser scanning unit;

wherein, said second lens includes a third optical surface and a fourth optical surface, having negative refractive power in main scanning direction on optical axis of said laser scanning unit; said fourth optical surface having an inflection point in SAG counted from the optical axis to peripheral portion and its paraxial portion is convex toward the polygon mirror side;

said first optical surface, said second optical surface, said third optical surface and said fourth optical surface are aspherical surfaces in the main scanning direction; satisfies the conditions of:

$$0.6 \leq \frac{d_1 + d_3 + d_5}{f_s} \leq 2.0; \text{ and}$$

$$0.4557 \leq \tan(\beta) \leq 0.7265;$$

wherein $d_1$ is a distance from a reflecting surface of the polygon mirror to said first optical surface of said first lens along the optical axis; $d_3$ is a distance from said second optical surface of said first lens to said third optical surface of said second lens along the optical axis; $d_5$ is a distance from said fourth optical surface of said second lens to said target along the optical axis; $f_s$ is a composition focal length of said two-element fθ lens; and β is a maximum effective window angle.

2. The two-element fθ lens with short focal distance as claimed in claim 1, wherein said two-element fθ lens with short focal distance in the main scanning direction satisfies the condition of:

$$0.22 \leq f_s \cdot \left( \frac{(n_{d1} - 1)}{f_{(1)Y}} + \frac{(n_{d2} - 1)}{f_{(2)Y}} \right) \leq 1.2;$$

wherein $f_{(1)Y}$ is a focal length of said first lens in the main scanning direction; $f_{(2)Y}$ is a focal length of said second lens in the main scanning direction; $f_s$ is a composition focal length of said two-element fθ lens, and $n_{d1}$ and $n_{d2}$ are refraction indexes of said first lens and said second lens respectively.

3. The two-element fθ lens with short focal distance as claimed in claim 1, wherein said two-element fθ lens with short focal distance in the sub scanning direction satisfies the condition of:

$$-2.82 \leq f_s \cdot \left( \frac{(n_{d1} - 1)}{f_{(1)X}} + \frac{(n_{d2} - 1)}{f_{(2)X}} \right) \leq -0.31;$$

wherein $f_{(1)X}$ is a focal length of said first lens in the sub scanning direction; $f_{(2)X}$ is a focal length of said second lens in the sub scanning direction; $f_s$ is a composition focal length of said two-element fθ lens; and $n_{d1}$ and $n_{d2}$ are refraction indexes of said first lens and said second lens respectively.

4. The two-element fθ lens with short focal distance as claimed in claim 1, wherein a size ratio of a largest spot on said target and the size ratio of a smallest spot on said target respectively satisfy the conditions of:

$$\eta_{max} = \frac{\max(S_b \cdot S_a)}{(S_{b0} \cdot S_{a0})} \leq 0.05;$$

$$\eta_{min} = \frac{\min(S_b \cdot S_a)}{(S_{b0} \cdot S_{a0})} \leq 0.005;$$

wherein $S_{a0}$ and $S_{b0}$ are root mean square radii of a spot of the scanning light on a reflecting surface of said polygon mirror in the sub scanning direction and the main scanning direction respectively; $S_a$ and $S_b$ are root mean square radii of any spot of the scanning light on a reflecting surface of said polygon mirror in the sub scanning direction and the main scanning direction respectively; $\eta_{max}$ is the ratio of the size of said largest spot scanned on said target to the size of the spot of the scanning light on a reflecting surface of said polygon mirror; and $\eta_{min}$ is the ratio of the size of said smallest spot scanned on said target to the size of the spot of the scanning light on a reflecting surface of said polygon mirror.

* * * * *